(12) United States Patent
Mohan et al.

(10) Patent No.: US 8,504,727 B2
(45) Date of Patent: Aug. 6, 2013

(54) METHOD AND APPARATUS FOR INTERWORKING ETHERNET AND MPLS NETWORKS

(75) Inventors: Dinesh Mohan, Kanata (CA); Gerald Smallegange, Stittsville (CA); Paul Unbehagen, Apex, NC (US); Nigel Bragg, Weston Colville (GB)

(73) Assignee: Rockstar Consortium US LP, Plano, TX (US)

( * ) Notice: Subject to any disclaimer, the term of this patent is extended or adjusted under 35 U.S.C. 154(b) by 497 days.

(21) Appl. No.: 12/016,190

(22) Filed: Jan. 17, 2008

(65) Prior Publication Data

US 2008/0172497 A1    Jul. 17, 2008

Related U.S. Application Data

(60) Provisional application No. 60/880,816, filed on Jan. 17, 2007.

(51) Int. Cl.
*G06F 15/16* (2006.01)
*H04J 3/16* (2006.01)

(52) U.S. Cl.
USPC ...... 709/249; 709/238; 709/245; 370/395.53; 370/466

(58) Field of Classification Search
USPC .................. 709/238–250; 370/395.53, 395.6, 370/466
See application file for complete search history.

(56) References Cited

U.S. PATENT DOCUMENTS

| | | | |
|---|---|---|---|
| 7,079,544 B2 | 7/2006 | Wakayama et al. | |
| 7,283,465 B2 * | 10/2007 | Zelig et al. | 370/219 |
| 7,453,888 B2 * | 11/2008 | Zabihi et al. | 370/400 |
| 7,483,411 B2 * | 1/2009 | Weinstein et al. | 370/338 |
| 7,570,648 B2 * | 8/2009 | Hu et al. | 370/396 |
| 7,643,409 B2 * | 1/2010 | Voit et al. | 370/218 |
| 7,644,317 B1 * | 1/2010 | Sajassi et al. | 714/43 |
| 7,710,936 B2 * | 5/2010 | Morales Barroso | 370/338 |
| 7,746,892 B2 | 6/2010 | Mohan et al. | |
| 8,050,279 B2 * | 11/2011 | Li et al. | 370/395.5 |
| 8,085,811 B2 | 12/2011 | Mohan et al. | |
| 2003/0026271 A1 * | 2/2003 | Erb et al. | 370/401 |
| 2003/0053414 A1 * | 3/2003 | Akahane et al. | 370/216 |

(Continued)

FOREIGN PATENT DOCUMENTS

| | | |
|---|---|---|
| JP | 2001-34586 A1 | 12/2001 |
| WO | 2004008696 A1 | 1/2004 |
| WO | 2006002230 A2 | 1/2006 |
| WO | 2007101140 A2 | 9/2007 |

OTHER PUBLICATIONS

Martini et al., "Encapsulation Methods for Transport of Ethernet Frames Over IP/MPLS Networks", Feb. 2003.*

(Continued)

*Primary Examiner* — Yasin Barqadle
(74) *Attorney, Agent, or Firm* — Christopher & Weisberg, P.A.

(57) ABSTRACT

MPLS networks offering PW or VPLS services may be interconnected with Ethernet networks implemented according to 802.1*ah* or 802.1Qay. The MPLS network may be a core and offer services to the Ethernet access networks, or vise-versa. Additionally, a mixture of different types of access networks may be interconnected by an MPLS core or an Ethernet core. Both network interworking and service interworking are provided. OAM fault detection may be implemented via maintenance entities extending across the network or end to end depending on the combination of networks and services offered by the networks.

17 Claims, 11 Drawing Sheets

U.S. PATENT DOCUMENTS

| | | |
|---|---|---|
| 2003/0142674 A1 | 7/2003 | Casey |
| 2003/0174706 A1 | 9/2003 | Shankar et al. |
| 2004/0133619 A1* | 7/2004 | Zelig et al. ............ 709/200 |
| 2004/0165600 A1* | 8/2004 | Lee ............ 370/395.53 |
| 2004/0184408 A1* | 9/2004 | Liu et al. ............ 370/236 |
| 2004/0184498 A1 | 9/2004 | Ueki |
| 2005/0018605 A1 | 1/2005 | Foote et al. |
| 2005/0027782 A1 | 2/2005 | Jalan et al. |
| 2005/0157645 A1 | 7/2005 | Rabie et al. |
| 2005/0157721 A1 | 7/2005 | Rabie et al. |
| 2006/0002370 A1 | 1/2006 | Rabie et al. |
| 2006/0013142 A1 | 1/2006 | Hongal et al. |
| 2006/0098654 A1* | 5/2006 | Tingle et al. ............ 370/389 |
| 2006/0133284 A1* | 6/2006 | Elie-Dit-Cosaque et al. ............ 370/241.1 |
| 2006/0198323 A1 | 9/2006 | Finn |
| 2006/0245436 A1* | 11/2006 | Sajassi ............ 370/395.53 |
| 2006/0245438 A1 | 11/2006 | Sajassi et al. |
| 2006/0251074 A1* | 11/2006 | Solomon ............ 370/392 |
| 2007/0098006 A1 | 5/2007 | Parry et al. |
| 2007/0286204 A1 | 12/2007 | Ould-Brahim |
| 2007/0297376 A1* | 12/2007 | Gass ............ 370/338 |
| 2008/0046597 A1* | 2/2008 | Stademann et al. ............ 709/249 |
| 2011/0064081 A1* | 3/2011 | Lee et al. ............ 370/392 |

OTHER PUBLICATIONS

International Search Report, from the International Searching Authority, Jun. 25, 2008, pp. 1-11.
Extended European Search Report and Written Opinion dated Feb. 21, 2012 for European Application Serial No. 08727858.6-2416, European Regional Stage Entry Date: Mar. 30, 2009 consisting of 12 pages.
V. Radoaca, et al.—"GVPLS/LPE-"Generic VPLS Solution based on LPE Framework, Internet Engineering Task Force (IETF) Internet Draft (ID) draft-radoaca-ppvpn-gvpls-01.tx, Oct. 2002.

* cited by examiner

METHOD AND APPARATUS FOR INTERWORKING ETHERNET AND MPLS NETWORKS

CROSS REFERENCE TO RELATED APPLICATIONS

This application claims the benefit of and priority from U.S. Provisional Patent Application No. 60/880,816 filed Jan. 17, 2007 entitled PBB/PBT MPLS INTERWORKING, the content of which is hereby incorporated herein by reference.

BACKGROUND OF THE INVENTION

1. Field of the Invention

The present invention relates to communication networks and, more particularly, to a method and apparatus for interworking Ethernet and MPLS networks.

2. Description of the Related Art

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how packets should be handled or routed through the network by the network elements, and how information associated with routing information should be exchanged between the network elements.

Ethernet is a well known networking protocol that has been defined by the Institute of Electrical and Electronics Engineers (IEEE) as standard 802.1. Conventionally, Ethernet has been used to implement networks in enterprises such as businesses and campuses, and other technologies have been used to transport network traffic over longer distances. As the Ethernet standards have evolved over time, Ethernet has become more viable as a long distance transport technology as well.

The original Ethernet standard allowed a source address (SA) and Destination Address (DA) to be specified. Over time, several additional fields have been added to allow other values to be designated with respect to a particular Ethernet frame. The original Ethernet frame format specified by IEEE 802.1 includes a source address (C-SA) and a destination address (C-DA). IEEE 802.1Q added a Customer VLAN tag (C-Tag) which includes an Ethertype, TCI information, and customer VLAN ID. IEEE 802.1ad added a provider VLAN tag (S-Tag), which also includes an Ethertype, TCI information, and subscriber VLAN ID. The C-Tag allows the customer to specify a VLAN, while the S-Tag allows the service provider to specify a VLAN on the service provider's network for the frame. These tags also allow the customer and subscriber to specify other aspects which are not relevant to an understanding of the contribution disclosed herein. When a network is implemented using 802.1ad it may be referred to as Q in Q encapsulation or Provider Bridging (PB). A domain implemented using this Ethernet standard will be referred to as a Provider Bridging (PB) domain.

The Ethernet standard has evolved to also allow for a second encapsulation process to take place as specified in IEEE 802.1ah. Specifically, an ingress network element to a service provider's network may encapsulate the original Ethernet frame with an outer MAC header including a destination address on the service provider's network (B-DA), a source address on the service provider's network (B-SA), a VLAN ID (B-VID) and a service instance tag (I-SID). The combination of customer MAC addresses C-SA and C-DA with the I-SID are commonly referred to as the I-Tag. A domain implemented using this Ethernet standard will be referred to as a Provider Backbone Bridging (PBB) domain.

There are also two other Ethernet standards that have been developed or which are in the process of being developed that may be used in one or more of the domains. Specifically, IEEE 802.1Qay specifies a way for the network elements to switch traffic based on the B-DA and B-VID rather than just forwarding the traffic according to the B-DA. The header of the frames forwarded on an Ethernet network established using this technology is not changed, but the manner in which the information is used is changed to allow forwarding to take place in a different manner. A network domain that forward traffic using this forwarding paradigm will be referred to as Provider Backbone Trunking (PBT). In IEEE 802.1Qay, PBT is commonly referred to as Provider Backbone Bridges-Traffic Engineering (PBB-TE). Thus, the term PBT will be used herein to refer to a network implemented according to this standard.

PBB, PB, and the original Ethernet standard use a spanning tree protocol to determine which links should be used to broadcast traffic on the network and which links should be used to forward unicast traffic on the network. To overcome some of the shortcomings of using spanning trees, another Ethernet control plane is in the process of being developed as IEEE 802.1 aq, in which a shortest path routing protocol such as Intermediate System to Intermediate System (IS-IS) or Open Shortest Path First (OSPF) is used in the control plane to establish forwarding paths through the network. Traffic on the domain may then be forwarded based on the B-DA and B-VID in a manner similar to PBT, but from a control perspective a shortest path routing protocol is used instead of a spanning tree to define routes through the network. A domain implemented in this manner will be referred to herein as a Provider Link State Bridging (PLSB) domain. PLSB is described in greater detail in U.S. patent Ser. No. 11/537,775, filed Oct. 2, 2006, entitled "Provider Link State Bridging," the content of which is hereby incorporated herein by reference. Since PLSB refers to the control plane, it may be used to control forwarding of packets while allowing encapsulation of the packets using PB, PBB, or PBT as described above.

MPLS is another commonly used networking protocol. MPLS specifies a way in which a label switched path may be established through a network. When a packet is received at an MPLS Label Edge Router (LER) the LER will determine the destination LER for the packet, attach a label to the packet, and forward the packet to a first Label Switch Router (LSR) on the path to the destination LER. The LSR will strip the label from the packet, look up the label to determine the next label to be applied to the packet and the next hop for the path, and forward the packet onward to the next hop. This proceeds hop by hop across the network to cause the packet to be forwarded across the Label Switched Path (LSP) through the MPLS network.

The LSP connects a pair of nodes on the MPLS Network. Since more than one customer may need to transmit traffic between the pair of endpoints, it is desirable to allow multiple customers to share one LSP rather than creating a new LSP for each customer. In MPLS, this is accomplished through the use of Pseudowires. Pseudowires allow traffic for different VLANs to be tagged with a service label, so that traffic from multiple customers, VPNs, etc., can use a common LSP and be differentiated by the egress LER. A service that utilizes a pseudowire will be referred to as a Virtual Private Wire Service (VPWS).

In addition to pseudowires, a branching mechanism was developed for MPLS that will allow a given packet that is received at a label switch router (LSR) to be duplicated and passed out of more than one forwarder. A service that utilizes this feature of an MPLS network will be referred to as a Virtual Private LAN Service (VPLS). VPLS uses pseudowires to set up the paths through the network but allows the paths defined by the pseudowires to branch to emulate a Local Area Network (LAN).

VPLS uses the signaling protocol described in draft-ietf-12vpn-signaling-08.txt and IETF RFC 4447 to set up pseudowires. The content of each of these protocols is hereby incorporated herein by reference. RFC 4447 introduces the concept of an Attachment Group Identifier (AGI) that may be conceptualized as a VPN identifier or VLAN identifier. The AGI specifies a logical group of forwarders at the egress node, rather than a particular individual forwarder. When implemented in this manner, an attachment circuit associated with a particular VPLS or pseudowire is constructed to include the Attachment Group Identifier (AGI) that identifies the group of forwarders, and an Attachment Individual Identifier (AII) that identifies a particular forwarder within the group.

In operation, the MPLS network will establish label switched paths through the network using a Label Distribution Protocol (LDP). As part of this process, the LDP will allow the Label Edge Routers (LERs) to exchange AGI/AII pairs that will allow the network to setup the dataplane for the pseudowires. This will set up the forwarders at the nodes to cause the packets to be forward in a specified manner. When a frame arrives at the ingress LER, the ingress LER will check the signaled value of AGI/AII pairs with local information and apply a service label as well as a tunnel label. The tunnel label will be used to forward the frame along the LSP through the MPLS network, while the service label will be used by the egress node to obtain the context of the pseudowire at the egress so that the frame may be sent to the correct set of forwarders. The forwarders will then be used to forward the traffic to the correct customerNVPN as the traffic exits the MPLS network. The AGI/AII pairs are thus used in the signaling phase of establishing the VPLS service by the ingress/egress LERs to coordinate how frames should be handled at the egress to cause the frames to be forwarded to the correct customers.

To monitor how a network is operating, such as to perform fault detection, fault isolation, fault confirmation, and other types of fault detection and remediation, an operator may want to send Operation, Administration, and Maintenance (OAM) service frames across the network. Different OAM flows may be used to monitor different aspects or segments of a connection on the network. For example, an OAM flow may be used end-to-end across the network, may be used to monitor the connection within a particular domain, or may be used to monitor other aspects of the connection on the network. A particular OAM flow will be referred to herein as a Management Entity (ME). By monitoring a particular ME the network manager may determine whether connectivity exists across that portion of the network, and if connectivity does not exist, may enable the network manager to isolate the fault on the network. When Ethernet networks and MPLS networks are required to connect together, a network manager may need to be able to define Maintenance Entities across a combined MPLS/Ethernet network As discussed above, both Ethernet networks and MPLS networks have implemented features that will allow traffic from different VLANs to be identified, and which will also allow traffic associated with particular service instances within a VLAN to be identified. When the networks are interconnected, it would be advantageous to allow interworking to occur, either at the network level or service level, so that particular services may be offered end-to-end across the interconnected network. Additionally, from a management perspective, it would be advantageous to enable OAM Maintenance Entities to be defined to monitor aspects of the MPLS/Ethernet network.

SUMMARY OF THE INVENTION

MPLS networks offering PW or VPLS services may be interconnected with Ethernet networks implemented according to 802.1ah or 802.1Qay. The MPLS network may be a core and offer services to the Ethernet access networks, or vise-versa. Additionally, a mixture of different types of access networks may be interconnected by an MPLS core or an Ethernet core. Where service frames are to be mapped from an ingress Ethernet network to an egress Ethernet network across an MPLS network, the VLAN ID value will be set to correspond to a PW through the MPLS core to reach the particular egress Ethernet network. Where the MPLS core implements VPLS, the destination address may be selected to allow the Ethernet network to select the correct VPLS instance. Where an Ethernet core is used, the Ethernet core may select a tunnel based on the pseudowire label associated with the service frame or based on the B-VID, I-SID, or B-VID and B-DA associated with the service frame.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

When an Ethernet network and an MPLS network are interconnected, the two networks will pass protocol data units between each other. Depending on how the networks are connected, service instances on one network may be translated to service instances on the other network. A system that interconnects networks of different types in this manner will be referred to herein as "service interworking." Service interworking implies that a handoff to another domain is such that the other domain identifies its service instance (e.g. PW/VPLS) from service frames, translates service frames to its service instance, and transports them. Transformation of service frames is expected inside the other domain in this case. In an Ethernet/MPLS context, service interworking may occur in various ways. For example, service interworking may occur where the MPLS network identifies its service instance such as PW or VPLS from the I-SID or other service identifier in use on the Ethernet network.

Another way of interconnecting two domains is for the two domains to encapsulate service frames for transport without transforming the service frames. An interconnection of this nature will be referred to herein as network interworking. In an Ethernet to MPLS context, Network Interworking may occur in various ways. For example, network interworking may occur where the MPLS network identifies its service instance such as PW or VPLS from the VLAN ID in use on the Ethernet network.

There are many interworking cases that are possible, due to the myriad different types of Ethernet and the several different ways in which an MPLS network may be instantiated. Several ways of interworking MPLS and Ethernet networks are set forth below. Since there is a large deployed base of MPLS networking gear, an emphasis on selecting ways to interwork MPLS and Ethernet networks has been provided that will minimize the amount of modification required on the MPLS networking gear.

Figure 1:
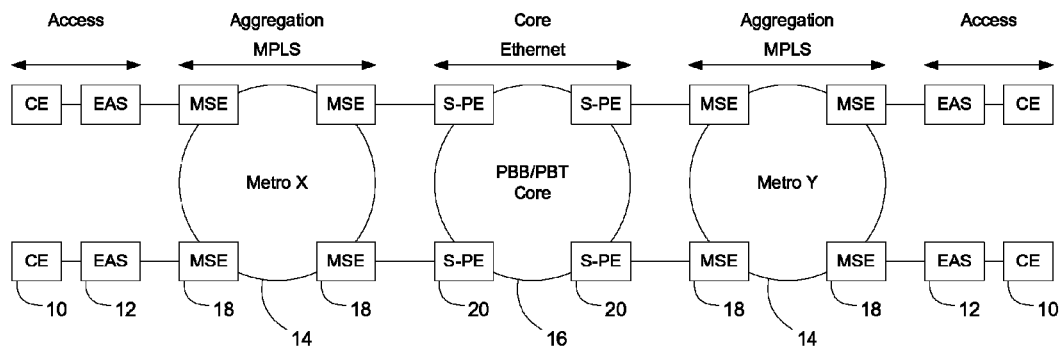
FIGS. 1-3 are functional block diagrams of communication networks showing three example ways in which Ethernet and MPLS network domains may be connected.
Figure 2:
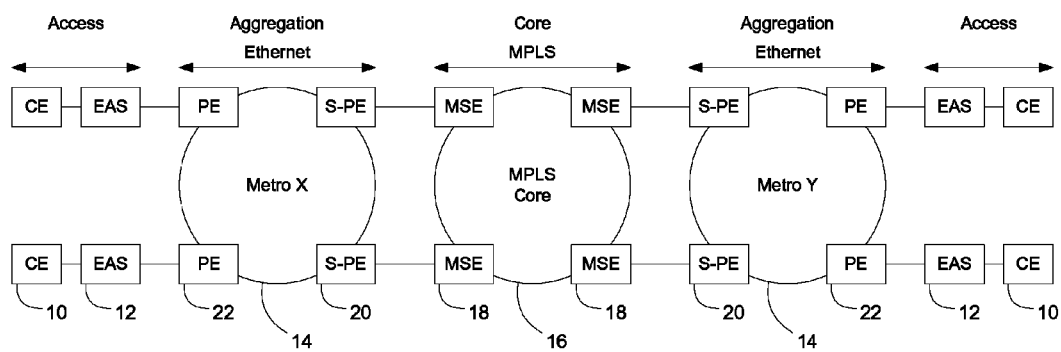
Figure 3:
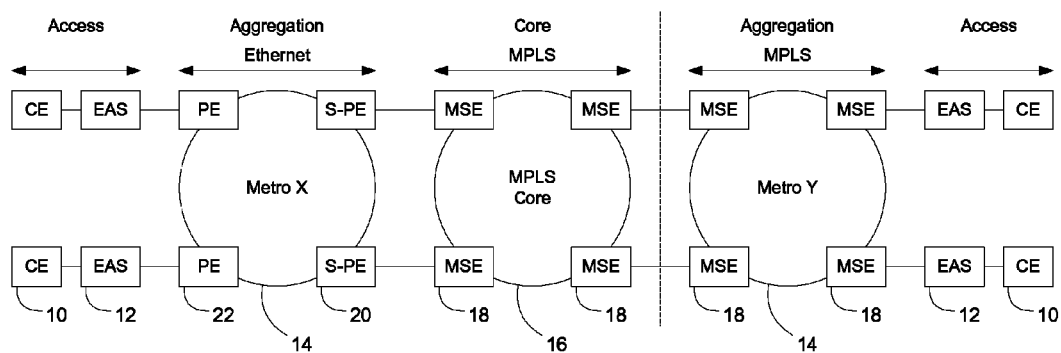

FIGS. 1-3 illustrate three example communication networks and show three example ways in which Ethernet and MPLS network domains may be connected. In FIG. 1, Customer Edge (CE) devices 10 connect via an Ethernet Access Switch 12 to an aggregation network 14 such as a metropolitan (Metro) area network. The use of an Ethernet Access Switch is optional, and the invention is not limited by the manner in which the Customer Edge devices 10 connect to the aggregation network. Additionally, Ethernet Access Switches have many common names, such as Network Interface Demarcation (NID) and thus many different ways may be used to access the networks described herein. Additionally, throughout this description the term "metro" network will be used to refer to an aggregation network. The invention is not limited to an implementation that interworks a metropolitan area network with a core network, however, as embodiments of the invention may be utilized to interwork Ethernet and MPLS domains of any desired size and in any desired context. The metro network is connected to a core network 16, which may be connected to other metro networks.

The metro networks may be implemented using MPLS and the core network may be implemented using Ethernet, as shown in FIG. 1. Alternatively, the core network may be implemented using MPLS and the metro networks may be implemented using Ethernet as shown in FIG. 2. Still alternatively, a mixture of Ethernet and MPLS networks may be used to implement the metro networks and MPLS or Ethernet may be used in the core as shown in FIG. 3. The Ethernet and MPLS networks thus may be connected together in many different ways and, accordingly, it may be desirable to interwork the networks differently depending on the particular context.

Additionally, two or more of the metro networks may be implemented using a common control plane, so that the two metro networks are to be considered to be one logical network. Interworking another network with the common metro networks may need to take into account the fact that the two metro networks are implemented using a common control plane so that flows of data may be commonly implemented by the metro networks without alteration by the intervening core network. Thus, many different network scenarios are possible and, depending on the particular implementation, the manner in which the networks are interworked may vary as well.

In FIG. 1, the Customer Edge (CE) 10 will pass a packet/frame to the Ethernet Access Switch (EAS) 12. The EAS will pass the packet to a Multi-Service Edge (MSE) 18 on the MPLS network which will place the packet on a Label Switched Path (LSP) across the metro network. The MPLS network may implement pseudo-wires (PW) or Virtual Private LAN Service (VPLS) depending on whether the Label for the packet is selected based on the packet's IP address or IP address and VLAN ID. The packet will be received by another MSE on the edge of the metro network and passed to a Switching-Provider Edge (S-PE) 20 on the core network.

The metro network 14 in FIG. 1 is an MPLS network having a plurality of Multi-Service Edge (MSE) network elements configured to receive traffic and put the traffic onto Label Switch Paths (LSP) through the network. The MSE network elements act as Label Edge Routers (LERs) that assign labels to packets according to the path the packet is to take through the MPLS network. The MSE also adds one or more PseudoWire (PW) tags to enable traffic from multiple customers to be multiplexed across a given LSP through the network. In operation, a MSE will receive a frame from the S-PE and assign label and PW tag. The label will be used to forward the frame across the MPLS network and the PW tag will be used to demultiplex the frame to identify the customer flow associated with the tag.

The core network in the embodiment of FIG. 1 is an Ethernet network configured to operate using Provider Backbone Bridging (PBB) defined by IEEE 802.1ah (Mac in Mac) or Provider Backbone Transport (PBT) defined by IEEE 802.1Qay. In a PBB network, packets are forwarded across the network based on the destination MAC address in the outer header of the packet. PBT networks allow traffic engineering to take place on the network to allow explicit paths to be set up across the network based on VLAN ID (VID), and forwarding takes place within the network based on both the destination address and VLAN ID. Optionally, within the same network a range of VIDs may be used to implement PBT while other VIDs can be used to implement PBB. Thus, the two types of networks may coexist. In the following description, particular reference may be made to particular types of Ethernet networks being interworked with MPLS networks. This description is not to be construed as an indication that only one type of Ethernet network exists, but rather is to be construed as referring to how a particular type of Ethernet technology may be adapted to interwork with an MPLS network. Other Ethernet standards may be implemented as well, and as new standards are developed the concepts disclosed herein may be extended to interoperate with those new standards where applicable.

In the example shown in FIG. 1, the metro network has a plurality of MSEs 18 configured to implement user to network interface (UNI) interfaces to enable customers (e.g. CE 10 or EAS 12) to connect to the metro network. On the boundary between the metro network 14 and the core network 16 the network elements will implement Network to Network Interfaces (NNIs) to enable the network element to connect to other network elements.

FIG. 2 is similar to FIG. 1, except that the Metro networks are implemented as Ethernet networks (either PBB, PBT) and the core network is an MPLS network (PW or VPLS). FIG. 3 is also similar except that the metro networks are a mixture of Ethernet and MPLS, and the core is an MPLS network. Other network scenarios are also likewise possible.

Figure 4:
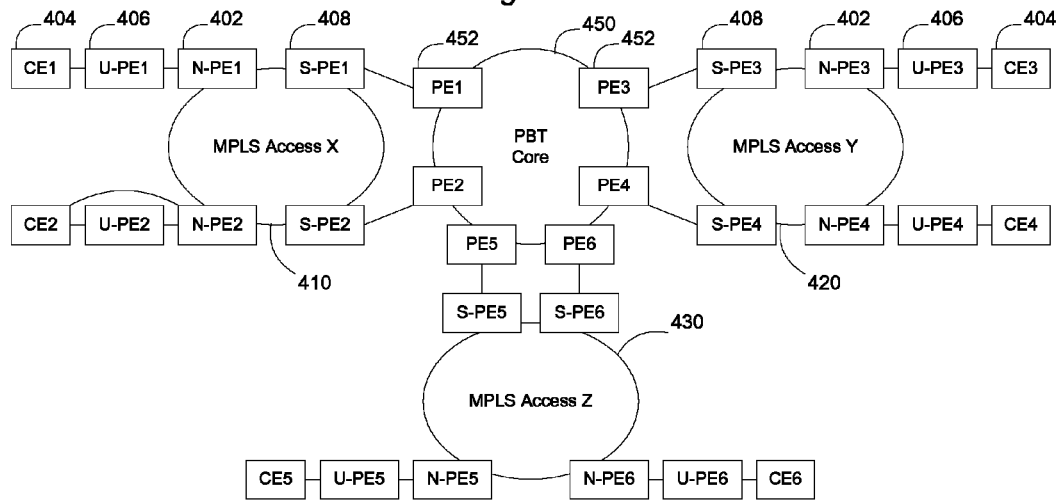
FIG. 4 is a functional block diagrams of a reference view of a network including MPLS networks and an Ethernet (PBT) core network.
Figure 6:
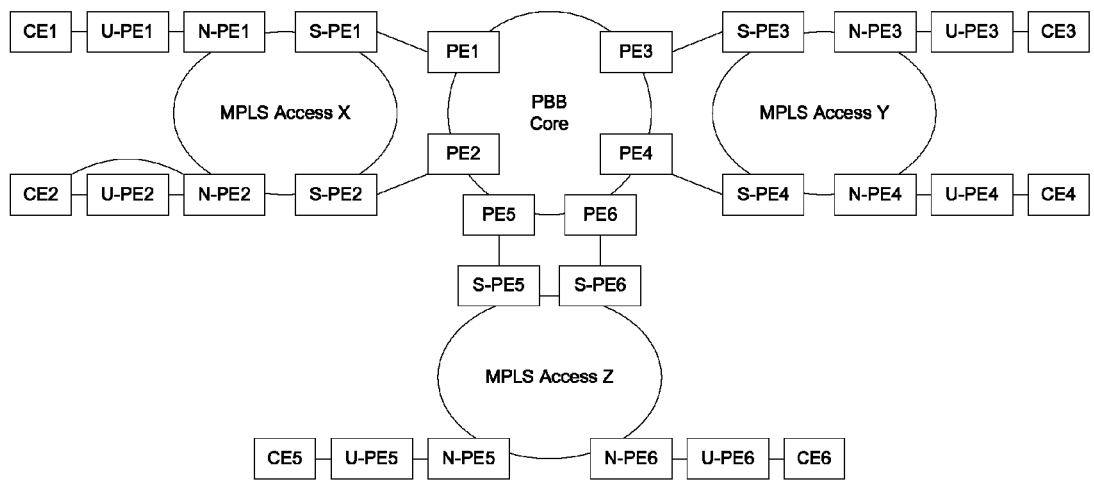
FIG. 6 is a functional block diagrams of a reference view of a network including MPLS networks and an Ethernet (PBB) core network.

FIG. 4 shows an example network 400 where three MPLS access networks 410, 420, 430 (metro networks) are interconnected by a PBT core network 450. FIG. 6 shows a similar embodiment in which a PBB core network 650 is used to interconnect MPLS metro networks. As mentioned above, as used herein the term Provider Backbone Trunking (PBT) refers to a network that is implemented using Ethernet standard IEEE 802.1Qay, which allows traffic engineered paths to be established through the network. The manner in which PBT operates is specified in IEEE 802.1Qay, the content of which is hereby incorporated herein by reference. The term Provider Backbone Bridging (PBB) refers to an Ethernet network that is established using Mac in Mac encapsulation to allow forwarding within the network to occur based on provider MAC addressing rather than customer MAC addressing. The manner in which PBB operates is specified in IEEE 802.1ah, the content of which is hereby incorporated herein by reference.

In the embodiment shown in FIG. 4, MPLS access networks include Network Provider Edge (N-PE) network elements 402 that interface with customers, such as Customer Edge (CE) 404 or User-Provider Edge (U-PE) 406. The MPLS access networks also include Switching Provider Edge (S-PE) 408 that connect to the core network 450. The PBT core network includes Provider Edge (PE) network elements 452 that interconnect the core network with the access networks.

In a scenario such as the one shown in FIG. 4, the MPLS access networks and PBB or PBT core network may be interworked at the network level or the service level. If the networks are interworked at the network level, the MPLS domain will consider the PBB/PBT domain as a server domain and will not peer with it. The MPLS domain nodes will peer on either side of the PBB/PBT domain, however. The MPLS domain will transmit and receive Ethernet encapsulated frames containing LSP payloads, where Ethernet encapsulation is link local (link here is represented as between two MPLS peer nodes, which is virtualized over the PBB/PBT domain). The PBB/PBT domain would therefore receive Ethernet frames which would need to be mapped to PBB/PBT service instances.

Accordingly, from a network interworking standpoint, the PBT domain requires the MPLS domains to use virtual links (i.e. VLANs) such that an MPLS node only uses a virtual link such that it is dedicated for a single peer MPLS domain only. By causing a particular MPLS domains to use a different VLAN value or set of VLAN values for each of the other MPLS domains, the ingress nodes on the PBT core may map the VLAN values to PBT trunks in the PBT core to cause the frames to be forwarded to the correct MPLS domain. Thus, for example, assume that VLAN 1 was used by MPLS domain X for traffic intended for MPLS domain Y, and that VLAN 2 was used by MPLS domain X for traffic intended for MPLS domain Z. By using a different VLAN ID for each of the destination MPLS domains, the ingress node on the PBT core may select a trunk to carry the traffic to either MPLS domain Y or MPLS domain Z by looking at the VLAN ID associated with the frame.

Where different PBT trunks are required to have different traffic engineering requirements, more than one PBT trunk may be implemented between the same set of metros. Thus, optionally, a set of VLAN values may be used to designate a set of PBT trunks extending between the pair of metros. If the MPLS domains are not able to implement virtual interfaces, i.e. implement different VLAN IDs for different destination MPLS domains, then a PBB core network should be used instead of a PBT core network. Alternatively, the S-PEs may use different ports (physical interface) for each metro such that the PE is able to map traffic to different PBT trunks to different metros based on the ingress physical interface.

If the networks shown in FIG. 4 are to be interworked at a service level, then the MPLS domains will consider the PBB/PBT domain as a peer domain. The MPLS domain will transmit and receive Ethernet encapsulated frames containing a pseudowire payload. Ethernet encapsulation, in this instance, will be link local for the link between the MPLS and PBB/PBT nodes. The PBB/PBT domain will receive Ethernet frames, de-encapsulate the frames to obtain access to the PW encapsulated frames. Thus, where the networks are to be interworked at the service level, the PBB/PBT domain will preferably support Pseudo Wire signaling in line with MS-PW. Alternatively, static configuration may be used as well. Additional details of this type of interworking will be described below in connection with FIGS. 9-12.

In the Example shown in FIG. 4, the access switch (U-PE) 406 hands off native service frames to the MPLS access switch (N-PE) 402 to be carried transparently over a PseudoWire (PW) service. The N-PE 402 encapsulates different native services (e.g. TDM) over PWs. The N-PEs establish end-to-end PWs. The S-PEs may optionally run directed LDP sessions between them. The PBT core appears as a single Ethernet link between the S-PEs. The S-PEs also establish LSPs among each other. The PBT core provides transport of LSP tunnels. Thus, for example in FIG. 4, S-PE1 will establish an LSP with S-PE3 that spans the PBT core. The PBT core will provide transport service for packets passed along the LSP between S-PE1 and S-PE3. Within each MPLS network, an LSP will also be set up between the N-PE and S-PE. Thus, for example, an LSP may be set up between N-PE 2 and S-PE1 in MPLS network X, and similarly between S-PE3 and N-PE 4 in MPLS network Y. The LSP may be one LSP across both MPLS domains and the PBT domain, or may be individual LSPs in each of the three segments.

The PEs offer PBT trunks, such that frames entering the PBT network either carry tags that are dedicated to connection a MPLS domain with only a single other domain (i.e. dedicated virtual interfaces as described above) or carry the S-PE's DA with a common tag. The PE will map frames received from the S-PE to a PBT trunk based on the tag associated with the frame, or uses the VLAN and DA to identify the PBT trunk. For resiliency and loop avoidance, the PEs may establish both primary and backup trunks.

A packet may be provided with a particular quality of service in the MPLS network. For example, the access switch U-PE or MPLS access switch (N-PE) may set the LSP Exp bits in the MPLS header to indicate a particular class of service. To allow the Ethernet network to afford the same quality of service to the packet as it traverses the core network, it may be desirable to map the LSP Exp bits to the B-Tag p-bits in the Ethernet header. The p-bits are three bits specified in the B-Tag which are defined by IEEE 802.1p to be used to indicate a quality of service. Optionally the p-bits associated with the Ethernet header that is applied to the packet as it traverses the PBT network may be set to provide a quality of service akin to that associated with the packet in the MPLS network.

Figure 5:
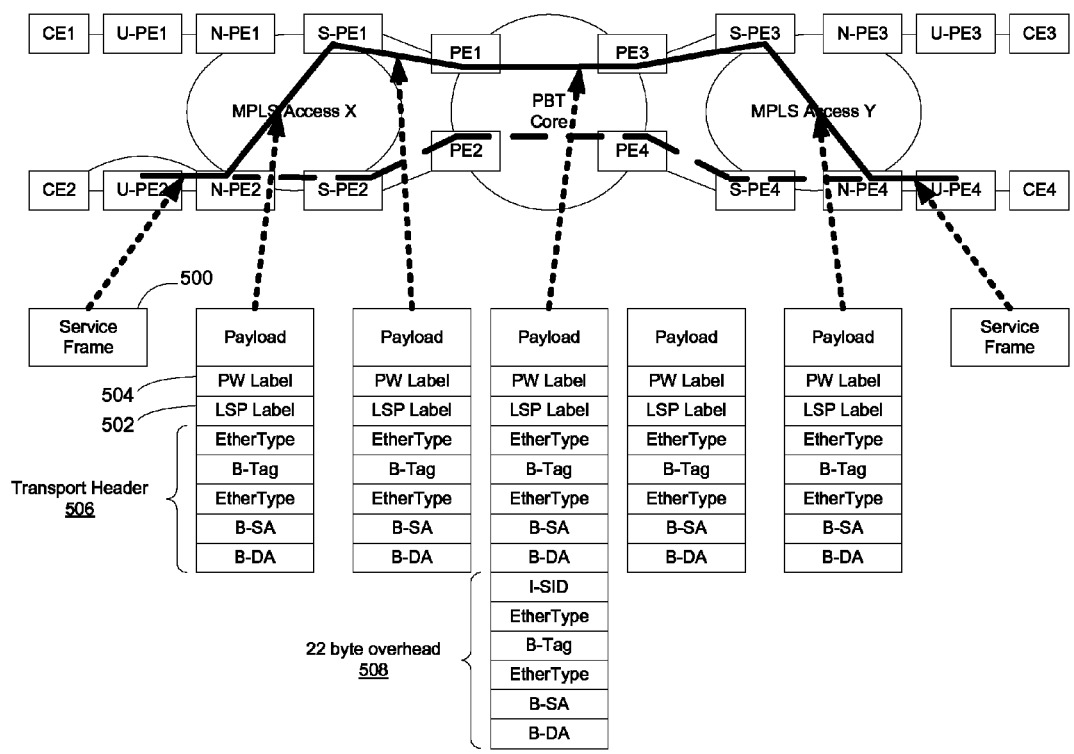
FIG. 5 is a functional block diagram of a path through the reference network of FIG. 4 illustrating the format of the headers applied to the data as it traverses the network according to an embodiment of the invention.

FIG. 5 shows encapsulations that may occur to a packet as it traverses the network of FIG. 4. In the example shown in FIG. 5, it will be assumed that the packet is received at U-PE2 on MPLS access network X from CE2, and is addressed to CE4 connected to U-PE4 on MPLS access network Y.

As shown in FIG. 5, the U-PE2 will output a service frame 500 which, when received by N-PE2 will be mapped to a LSP to N-PE4. The LSP to be used to carry the packet from N-PE 2 to N-PE 4 may extend end-to-end between the two MPLS networks or may terminate in each MPLS network. For example, a first LSP may extend from N-PE2 to S-PE1, a second LSP may extend from S-PE1 to SPE3, and a third LSP may extend from S-PE3 to N-PE4. Alternatively, a single LSP may extend from N-PE2 to N-PE4. Where more than one LSP segment is involved, the end point between the two segments will separately signal the LSPs and map traffic from one to the next to complete a path through the network. Similarly, the network element in this instance may also map PWs on the different LSP segments to allow PW service to extend end-to-end across the network.

In the example shown in FIG. 5, when N-PE2 receives a packet it will assign a LSP label 502 to the packet and a PW label 504 to the packet. The LSP in this instance identifies the path through the network, while the PW label allows traffic from multiple customers to be multiplexed on the same LSP and discerned by the end router so that the different traffic may be forwarded to the correct customer on the egress from the network.

In addition to the LSP label and PW label, the N-PE will assign a link layer Ethernet header (transport header 506) that will be used by the network element to forward the packet toward the next hop on the MPLS network. Each hop on the MPLS network will remove the transport header, read the LSP label, swap the LSP label with a new LSP label, and forward the packet toward the next hop on the MPLS network. The manner in which the MPLS network operates is not intended to deviate from standard practice.

When the S-PE receives the packet it will perform a label swap as normal and forward the packet over the LSP that passes through the PBT core network. The PE, upon receipt of the packet, will determine the PBT trunk to be used to carry the packet as described in greater detail above. For example, the PE may read the B-DA associated with the transport header or the B-VID contained in the B-TAG to determine the PBT trunk to be used to carry the packet across the PBT core network. The PE will then encapsulate the packet with a header 508 that will be used to transport the packet across the PBT core network. The header, may be a standard 802.1ah PBB encapsulation header that will be used to transport the packet across the PBT trunk on the PBT core network.

When the packet is received at the egress from the PBT network, the PE will strip off the header 508 and forward the packet to the S-PE3. The S-PE 3 will strip off the transport header 506, read the LSP label, and forward the packet toward N-PE4. Where the LSP over the PBT core and the LSP over the MPLS access network Y are different LSPs, the S-PE3 will map the packet from one LSP to the next before forwarding the packet toward the LPS on MPLS access network Y.

From a resiliency standpoint, the PBT network may implement primary and backup PBT trunks, so that the PBT trunks may be considered resilient. The MPLS domain can run its own resilient PWs, which are transparent to the PBT core. The nature of the interconnect determines the level of visibility and impact of any failure.

The solution described herein, in connection with FIGS. 4-5, allows the PEs to operate without reference to the PW labels. When dedicated virtual interfaces (i.e. VLAN IDs) are used by the S-PEs to forward traffic to different MPLS networks, the PEs may operate in a normal manner by using the VID to identify the I-SID and PBT trunk that are to be used to create the header 508 for use in transporting the packet across the PBT network. Additionally, the S-PE is not required to treat the link through the PBT network as anything other than a regular Ethernet link. However, this solution does require an additional 22 byte overhead for each frame passed across the PBT network, since as shown in FIG. 5 the encapsulation process performed by the ingress PE to the PBT network will result in an 802.1ah MAC header 508 to be applied to the frames as they enter the PBT network. Additionally, if the MPLS networks do not use virtual interfaces, and hence use the same VID to identify more than one other MPLS network, the PE may be required to use other fields to map incoming frames to PBT trunks. For example, the PE may be required in this instance to determine the I-SID and PBT trunk based on the DA rather than only the VID.

FIG. 6 shows another example in which a PBB core network implemented using 802.1 ah is used to interconnect MPLS access networks. As shown in FIG. 6, the access switch (U-PE) hands off native service frames to the MPLS access switch (N-PE) to be carried transparently over a PW service. The N-PE encapsulates different native services over pseudowires. The N-PEs may establish end-to-end PWs or may establish PWs with the S-PEs, and the S-PEs may establish PWs. Thus, the LSP and PWs may extend end-to-end between the N-PEs or may be segmented as described above in connection with FIGS. 4-5. As with the previous example, the PBB network will appear as a single Ethernet link between S-PEs on different MPLS access networks, and the PBB core will thus provide transport for the LSP tunnels.

The PEs offer E-LAN service connectivity across the PBB core. E-Line may be considered a special case of point-to-point E-LAN connectivity across the PBB core. Frames entering the PBB network carry the S-PE's DA and possibly a tag. PEs offer E-LAN service corresponding to the tag. One example of the tag that may be used in connection with this is the B-VID contained in the B-Tag.

When a packet arrives at the PE, the PE will use the B-VID and B-DA (indicating S-PE DA) from the transport header 606 to identify a service instance associated with the packet, and then encapsulate the packet for transport across a PBB tunnel through the PBB core network. As mentioned above with respect to the PBT core network, when a PE receives a packet it may be desirable to map the LSP Exp bits to the B-tag p-bits. This mapping is advantageous as both the EXP bit field and the p-bit field are three bits long, so that each accommodates 8 classes of service.

The PBB network may implement either a spanning tree or a link state protocol to control the PBB network. For example, it is common for PBB networks to implement a spanning tree protocol to implement resiliency and loop avoidance. Alternatively, a link state protocol such as OSPF or IS-IS may be used to control the network and provide resiliency and loop avoidance.

Figure 7:
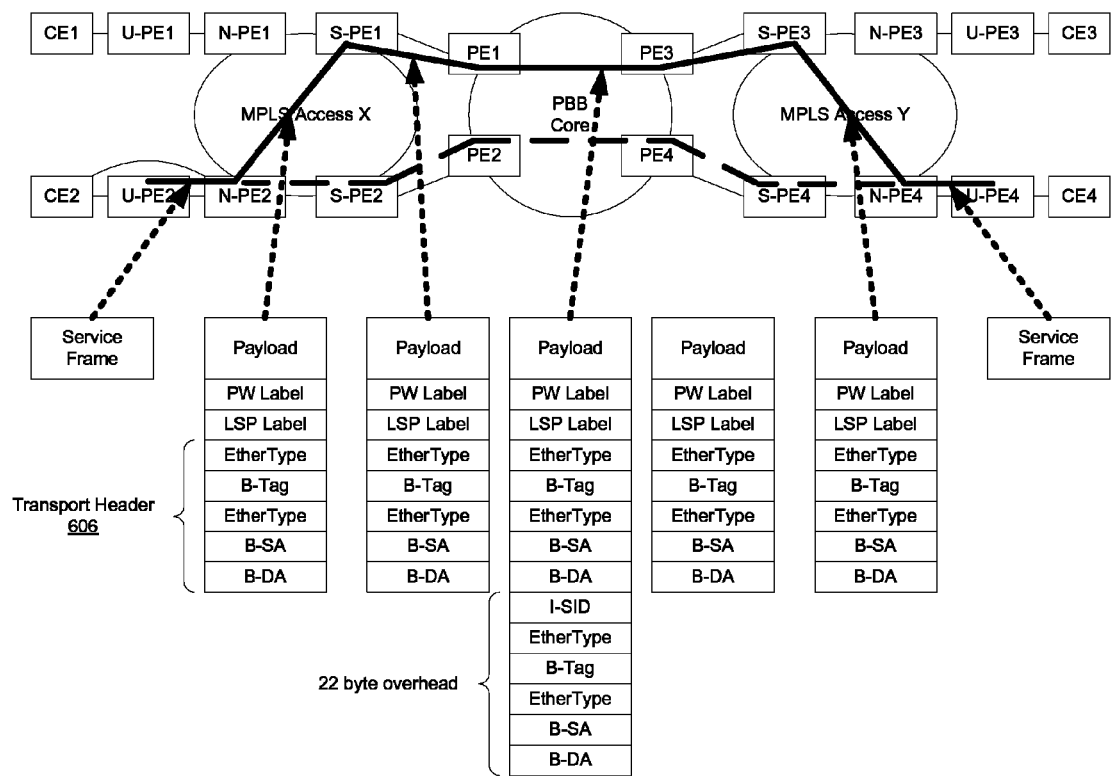
FIG. 7 is a functional block diagram of a path through the reference network of FIG. 6 illustrating the format of the headers applied to the data as it traverses the network according to an embodiment of the invention.

FIG. 7 shows the encapsulation that may occur as a packet traverses the interworked MPLS networks and PBB core network. As shown in FIG. 7, the encapsulation process is very similar to the process described above in connection with FIG. 5. For example, as a service frame enters the MPLS network it will be mapped to an LSP and PW, and encapsulated using a LSP label and PW Label. A transport header will be applied to transport the packet across the MPLS network. The transport headers are mostly link specific.

When the packet is received at the S-PE the S-PE will either forward the packet along the LSP onto the PBB network (where the LSP exists end-to-end between the N-PEs) or will translate the LSP from an LSP segment on the MPLS access network to an LSP that extends across the PBB core network. Similarly, the PW label may remain the same on the various LSP segments or may be translated by the S-PE if the packet is put onto a new LSP segment at the S-PE. The S-PE will then apply a link header to transport the packet to PE1.

From the S-PE standpoint, regardless of whether the LSP extends from end-to-end or there are multiple LSP segments, the next hop on the LSP as seen by the S-PE on the first MPLS network is the S-PE on the second MPLS network. For example, on the path shown in FIG. 7, the next hop for S-PE1 on MPLS access network X is S-PE3 on MPLS access network Y. Thus, the transport header applied by S-PE1 to the packet will point to S-PE3. Upon receipt, the PE will use the data contained in the transport header to map the packet to a PBB tunnel and apply a PBB header that will be used to forward the packet through the IP network.

From a resiliency standpoint, the PBB tunnels are resilient assuming that the PBB core is running either xSTP or a link state protocol on the control plane. Similarly, the MPLS domain can run its own resilient PWs which are transparent to the PBB core. The nature of the interconnect between the MPLS networks and the PBB core will determine the level of visibility and impact of a failure on the network.

One benefit of using a PBB core to interconnect multiple MPLS domains is that the PEs on the PBB core are transparent to the PW labels. Stated another way, the MPLS network is not aware of the PBB core and can implement PWs that span across the PBB core without requiring modification to the manner in which the S-PEs operate. Additionally, the PEs on the PBB core are not required to operate differently but rather can implement normal forwarding behavior and use the VID and DA of the transport header applied to incoming packets to identify the I-SID and PBB tunnel to be used to transport the packet across the PBB network.

Like the previous example, however, the PE will add a 22 byte header to each frame of the packet which increases the overhead associated with transmitting the packet across the PBB network. Depending on the nature of the traffic this may or may not be a concern. Additionally, the PBB network is still required to implement one or more spanning tree instances or a link state protocol to avoid loop formation and for resiliency.

The previous two examples, shown in FIGS. 4-5 and 6-7, assumed that the MPLS network was implementing PseudoWires (PWs). It is also possible for the MPLS network to offer Virtual Private LAN Service (VPLS) to customers. Where the MPLS network implements VPLS rather than PWs, the access switch (U-PE) will hand off native service frames to the MPLS access switch (N-PE) to be carried transparently over a VPLS service.

Figure 8:
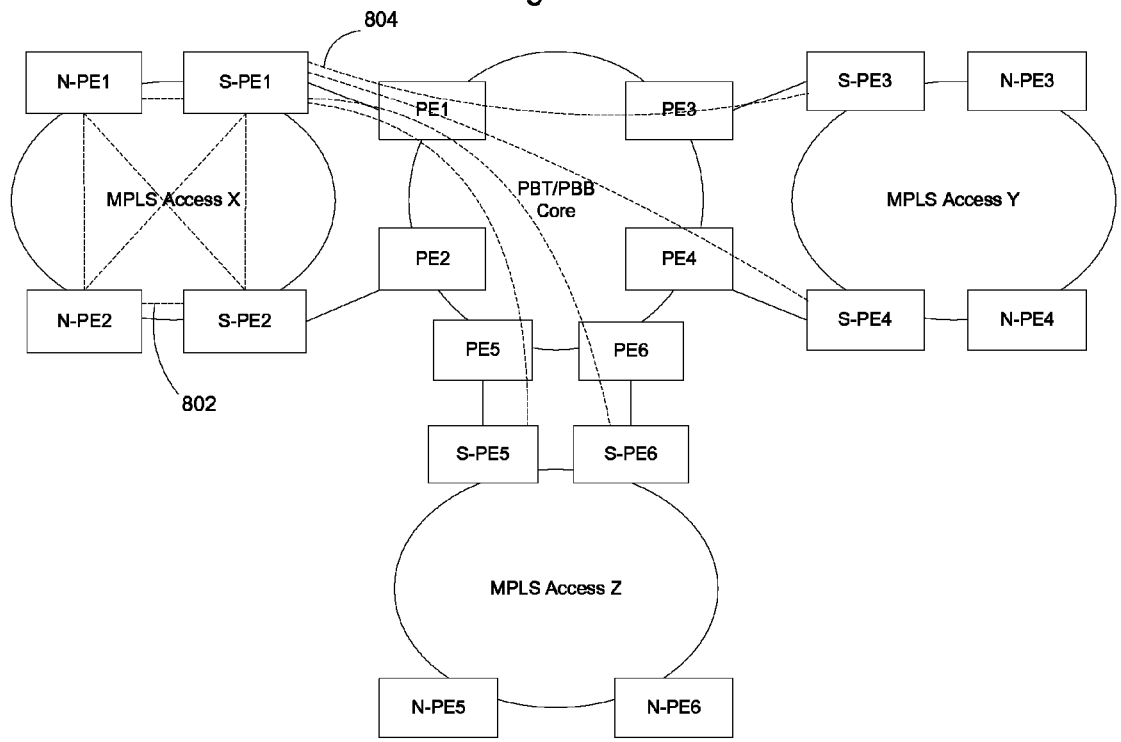
FIG. 8 is a functional block diagrams of a reference view of a network including MPLS networks and an Ethernet (PBT/PBB) core network.

To implement VPLS services, the N-PEs will establish a mesh of PWs interconnecting all of the N-PEs with all of the S-PEs. The S-PEs will also support spokes to all other S-PEs on all other metros. FIG. 8 shows an example of this in which a mesh of PWs 802 has been established in the MPLS access network X, and a mesh of PWs 804 to other S-PEs on other MPLS access networks.

When the N-PE receives a packet, it will encapsulate the frame with a PW label and LSP label and forward the packet across the PW to the S-PE. The S-PE replicates the frame at handoff, if the service instance spans more than one remote metro, and forwards multiple copies of the frame across the PWs to each of the S-PEs on each of the remote metros.

The PEs on the PBB/PBT network offer E-LINE/E-LAN service for connectivity across the PBB/PBT core. Frames entering the PBT/PBB core have a link level transport header including the DA of the intended S-PE on the remote metro network. The transport header may also include a VLAN ID or other tag. The PE uses the VLAN or the VLAN and MAC (DA) to identify the service instance in the PBB/PBT network that should be used to transport the packet across the PBB/PBT network. The PE will encapsulate the packet in a PBB/PBT tunnel (using the PBB encapsulation process of 802.1 ah, as described above in greater detail) and forward the packet across the network. Thus, the interworking between PBB/PBT networks and the MPLS network may be implemented, from a PE standpoint, in the same manner regardless of whether the MPLS network is offering a PW service or VPLS service.

Within the MPLS networks, a reservation protocol such as RSVP may be run to implement redundant spokes between each pair of metros. RSVP allows traffic engineered paths to be established through a network. Hence, RSVP may be used to create two separate paths between each pair of N-PE/SPE to allow for redundant paths to be created within the MPLS networks. The resilient paths within the metro are transparent to the PBB/PBT core.

As a summary, when a PBB or PBT network is implemented as the core network, and MPLS networks are used to implement the metro networks, the PE must recognize Ethernet frames encapsulating the MPLS payload from the MPLS networks. The PE may use the VLAN or the VLAN and DA from the transport header applied by the S-PE to map the packets to appropriate PBB or PBT tunnels through the network. Where the SPEs are able to implement VLAN sets containing one or more VLAN per remote metro, the PE may identify the PBB/PBT tunnel from the VLAN and map the packets to the appropriate PBB/PBT tunnel according to the VLAN. Where the SPEs are not able to implement one VLAN per remote metro, the PE may use the DA along with the VLAN to map the packets to the appropriate PBB/PBT tunnel. Optionally, the PE may also map the LSP EXP bits to PBB/PBT tunnel p-bits to allow the same quality of service features to be provided end-to-end across the MPLS/PBB/MPLS or MPLS/PBT/MPLS network.

When a PBB/PBT trunk fails, an alarm indication signal (AIS) may be transmitted toward the MPLS domain on a per-VLAN basis. This will allow the alarm indication signal to be propagated to the MPLS domain on the virtualized links to enable the MPLS domain to failover traffic to a backup path. By implementing AIS signaling from the PBB/PBT domain to the MPLS domain, the MPLS domain is not required to run end-to-end maintenance entities over the PBB/PBT domain, and may thus treat the PBB/PBT tunnels as a link. Implementation of this feature would require the S-PEs to be configured to implement Ethernet OAM signaling to allow the S-PEs to interpreted receipt of an AIS as a failure indication rather than a generic Ethernet frame. Accordingly, implementation of this feature may require modification of the S-PE to enable it to be implemented on the network.

Figure 9:
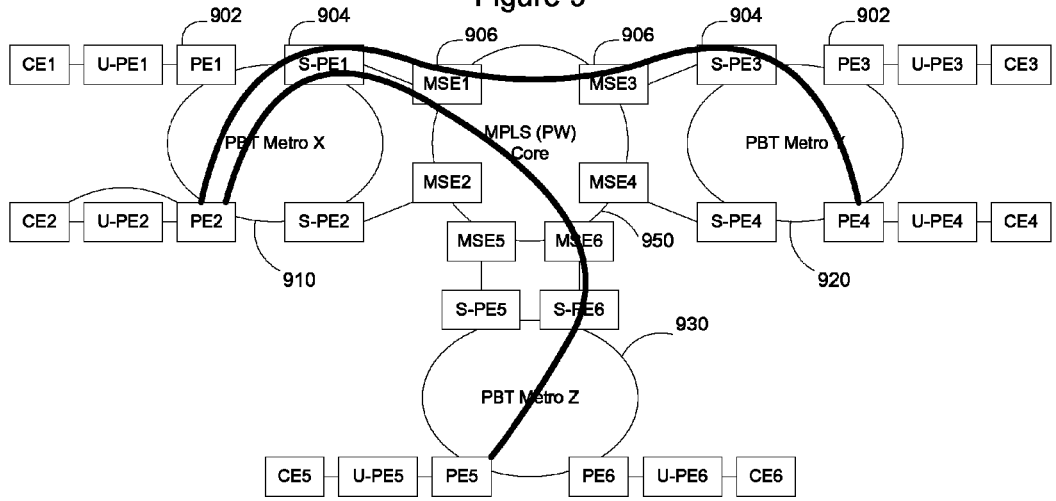
FIG. 9 is a functional block diagrams of a reference view of a network including Ethernet (PBT) networks and an MPLS (PW) core network.
Figure 10:
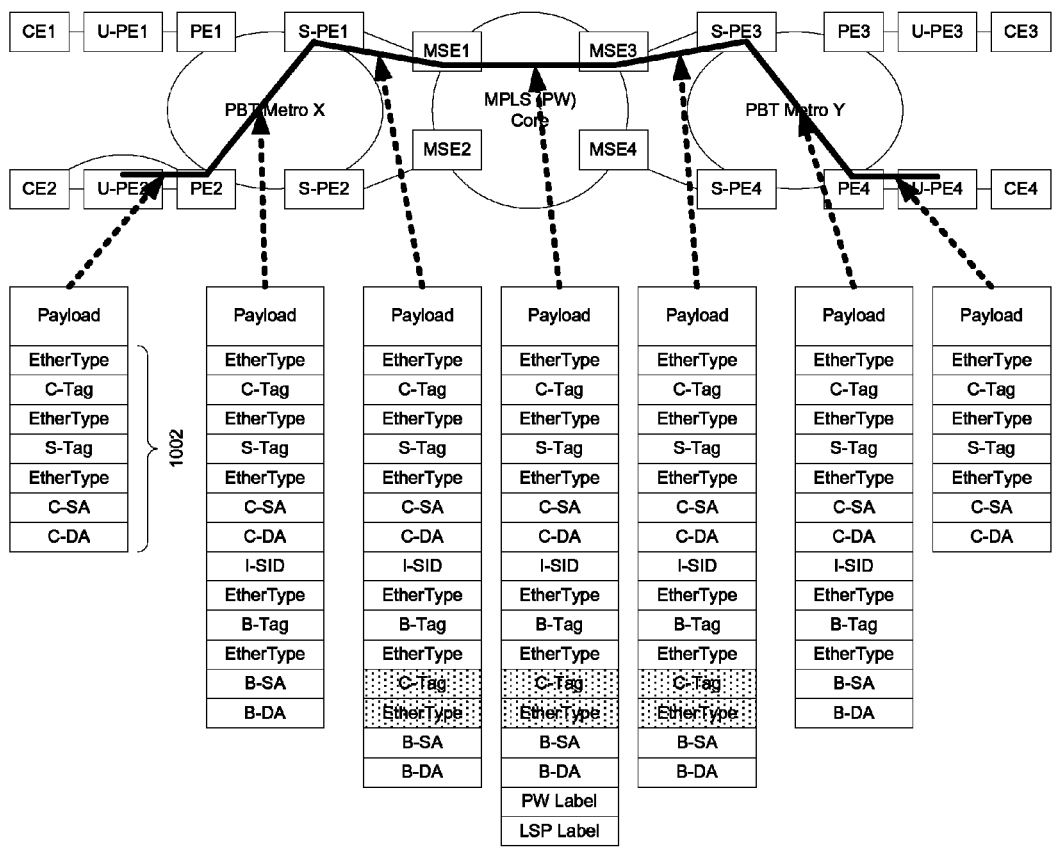
FIG. 10 is a functional block diagram of a path through the reference network of FIG. 9 illustrating the format of the headers applied to the data as it traverses the network according to an embodiment of the invention.

FIGS. 9 and 10 show an example network in which Ethernet access (Metro) networks 910, 920, 930, are interconnected by an MPLS core network 950. As shown in FIG. 9, Ethernet network includes a Provider Edge (PE) that receives traffic from customers and places the traffic onto the Ethernet network. Switching PEs (S-PE) 904 forward the traffic from the Ethernet network to the MPLS core network. The MPLS core network implements Multi-Service Edge (MSE) network elements 906 which receives traffic from the Ethernet network and puts the traffic onto Label Switched Paths (LSPs) through the MPLS core. The MPLS core may implement PseudoWire (PW) or Virtual Private LAN Service (VPLS) service.

From a network interworking perspective, the Ethernet domain would consider the MPLS domain as a server domain and would not peer with it. Ethernet domain nodes would peer on either side of the MPLS domain. The Ethernet domain would transmit and receive Ethernet encapsulated frames containing native payload. Optionally, the S-PE nodes may transmit PW encapsulated frames.

MSEs on the MPLS domain would receive Ethernet frames which would need to be mapped to PW or VPLS service instances. If the MPLS domain implements PW service, interworking can be accomplished by requiring the Ethernet domains to use correct B-VIDs to identify egress Metro domains, since the MSE is not able to map B-MAC addresses into PWs. Where the MPLS domain implements VPLS service, the MSE similarly determines the VPLS service instance based on the B-VID in the case of network interworking.

Where the networks are to be interworked at the service level, the Ethernet domain will consider the MPSL domain as a peer domain. The Ethernet domain transmits and receive Ethernet encapsulated frames. The MPLS domain receives Ethernet frames and de-encapsulates the frames to have visibility to the native service payload. Accordingly, service interworking requires the Ethernet domain to support PW signaling, unless static configurations are allowed at the edge of the domains.

FIGS. 9-10 show a single PBT implemented across a MPLS PW core. As shown in FIG. 9, the Ethernet access switch (U-PE) hands off Ethernet frames to the metro access switch (PE) to be carried transparently over an E-line service. The U-PE may encapsulate different native services, however the PE does not have visibility to these native services, but rather simply sees Ethernet frames.

The PE offers either a port-based E-line or a tagged E-line service. A port-based E-line service encapsulates all frames received on a particular port as a particular service instance. Tagged E-line service, by contrast, encapsulates frames received with a particular VLAN set, including one or more VLAN IDs, into a particular service instance for transmission over the PBT network. The PE will then encapsulate the frames into a PBT trunk for transmission across the PBT network. The I-SID is end-to-end unique across the combined Metro domains and, hence, the I-SID may be used end to end to identify the service instance associated with the frame.

According to an embodiment of the invention, the B-VIDs assigned to frames are allocated as belonging to a particular metro pair. Thus, in FIG. 9, traffic from PBT metro X with a destination of PBT metro Y would be assigned a first B-VID, traffic from PBT metro X to PBT metro Z would be assigned a second B-VID, etc. Each pair would thus use one particular B-VID. Optionally, traffic in the reverse direction (i.e. from Y to X or from Z to X) would use different B-VIDs. For resiliency, PE pairs maintain primary and secondary PBT trunks which are monitored via connectivity check messages (CCMs).

The MPLS core provides PW instances interconnecting each pair of metros. A PW instance is created per PBT B-VID PW instances can provide the same traffic profile as the PBT trunks, which allows the same QoS to be implemented in the core network as in the metro networks.

For example, as shown in FIG. 9, assume that PE 2 is required to transmit frames to PE 4 on PBT metro Y and is also required to transmit frames to PE 5 on PBT metro Z. If the MPLS core implements one PW per B-VID, S-PE1 may transmit frames to MSE1 intended for PE4 using (VID1, PE4) and may transmit frames to MSE1 intended for (VID2, PE5). The MSE is unaware where the PEs reside on the network but has a PW implemented per B-VID. Accordingly, the MSE may encapsulate the frames with B-VID=VID1 onto a PW to metro Y and may encapsulate the frames with B-VID=VID2 onto a PW to metro Z. Other MSEs would see different VIDs and associate those VIDs with different PWs, which allows BVIDs to be reused between different disjoint pairs of Metro networks. Additionally, the S-PEs do not need to add more information to the PBT frames at the handoff to the MPLS network.

According to an embodiment, the MPLS core implements a PW for each PBT VID. The S-PE does not need to maintain any additional mappings and forwards regular PBT frames to the MPLS core. For each metro, each PBT B-VID is allocated such that it connects to a single other metro. Within the MPLS core PWs are implemented between each metro such that traffic may be mapped according to the PBT B-VID to a PW in the MPLS core.

FIG. 10 shows an example encapsulation process that may be used to encapsulate traffic as it traverses a network having a single PBT domain implemented across multiple PBT metro networks, with an MPLS core. As shown in FIG. 10, when the U-PE transmits a frame to the PE it will be encapsulated with an Ethernet header 1002. The service frame includes a C-SA and A C-DA which are the MAC addresses associated with the service frame. Optionally, the service frame may include a C-Tag specified in 802.1Q and an S-Tag specified in 802.1ad, although these tags are not required and will depend on the particular implementation of the customer network. The service tag will not change as the frame is transmitted across the network.

When the frame is received at the PE, the PE will perform PBB encapsulation specified in 802.1ah to add an I-SID, Ethertype, B-TAG, Ethertype, B-SA and B-DA. The B-SA is the MAC address of the PE that received the frame from the customer, and the B-DA is the destination MAC address of the PE on the PBT domain. According to an embodiment, the B-TAG may be selected to include a B-VID that specifies the destination Metro network where the destination network element is located. Selecting the B-VID corresponding to the destination network allows the MPLS network to select a PW for the frame for use in transporting the frame across the MPLS network.

The PE will perform the PBB encapsulation and forward the frame across a PBT tunnel to the S-PE, which will forward the frame to the MSE on the edge of the MPLS network. The MSE will read the B-VID and use the B-VID to select a PW for the frame. The MSE will then attach a PW label and LSP label and forward the frame across the MPLS network. The MSE may also apply a further link-layer Ethernet header to the frame which will be stripped and replaced at each hop through the network.

Figure 11:
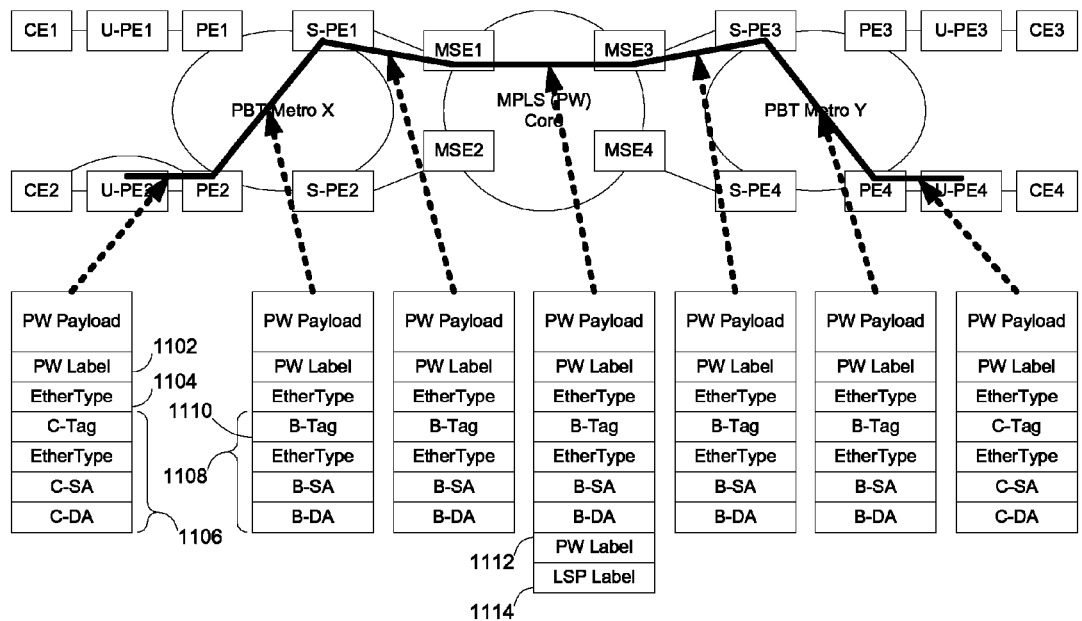
FIG. 11 is a functional block diagram of path through the reference network of FIG. 9 illustrating another format of the headers applied to the data as it traverses the network according to an embodiment of the invention.

FIG. 11 shows another embodiment in which PseudoWire (PW) signaling is supported end-to-end across the Ethernet network. In this embodiment, the service frame is considered the PW payload, and the U-PE or PE will attach a PW label 1102 to the PW payload for transmission across the network. The PW label 1102 may also be referred to as a Virtual Channel (VC) label. The U-PE will also attach an Ethertype 1104 to allow the frame to be identified as PW encapsulated. The U-PE will also attach a link layer Ethernet header 1106 identifying the PE as the destination of the frame and the U-PE as the source of the frame. The Ethernet header may also include one or more tags such as a C-Tag or an S-Tag (not shown).

When the PE receives the packet, it will strip off the customer header 1106 and add a provider header 1108. The provider header 1108 includes a B-TAG (which includes a B-VID), an Ethertype, and the provider source and destination MAC Address (B-SA and B-DA). The B-VID will be selected in this embodiment, as with the last embodiment, to identify the egress Metro network that contains the destination network element. The ingress PE on the PBT network will then forward the frame across a PBT trunk to the S-PE.

The S-PE will forward the frame to the MSE, which will use the B-VID 1110 to identify the PW, and attach a PW label 1112 and LSP label 1114 to the packet. The MSE will then forward the packet across the LSP to the destination metro network. Alternatively, where the MPLS network is implementing VPLS, the MPLS network would implement a VPLS per B-VID, and make forwarding decisions based on B-DA. The egress MSE will strip the PW and LSP labels off the packet and forward the packet to the S-PE of the egress metro. The Egress metro will forward the packet across the PBT trunk in the PBT network to the destination.

Figure 12:
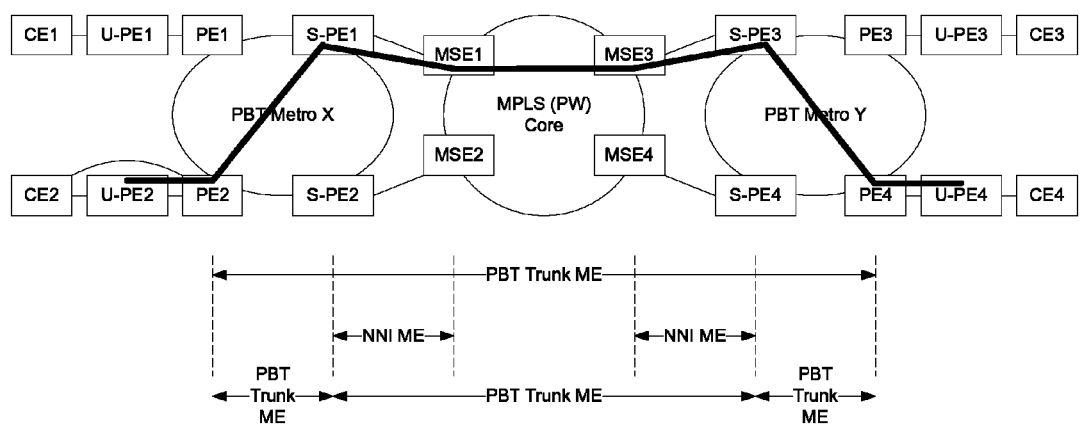
FIG. 12 is a functional block diagram showing example maintenance entities that may be implemented in the network of FIG. 9 according to an embodiment of the invention.

From an OAM standpoint, PBT trunk OAM maintenance entities may be monitored on an end-to-end basis. When a PBT trunk fails, the head-end can switch the services, represented by I-SIDs onto backup PBT trunks. When a PW fails, the MSE can notify via AIS on the PBT trunk, if the MSE supports Ethernet OAM. FIG. 12 shows some of the OAM maintenance entities that may be implemented to support end to end OAM on the PBT trunks within the network of FIGS. 9-11.

One of the advantages of interworking PBT metro networks with an MPLS network are that the S-PEs are not required to introduce modifications into the data path to implement the handoff to the MPLS network. Additionally, the S-PEs do not need to maintain visibility to the I-SIDs or individual service instances. End-to-end trunk level OAM is possible and is independent of the MPLS core. Additionally, end-to-end service level OAM is also possible.

On the other hand, the end-to-end PBT OAM does not scale well. The metros are also not autonomous, and need to have visibility into each other's address space. OAM scaling issues, e.g. via AIS, can be addressed but require Ethernet OAM support in the MSEs. Additionally, when the MPLS network is implementing VPLS, a MSE Virtual Switch Instance (VSI) is required on a per-port basis, and the MSE will make forwarding decisions based on the B-DA.

In the previous description it was assumed that the S-PE would forward the packets from the PBT network to the MPLS network without performing B-VID translation. It is possible to implement a mapping at the S-PE that would allow B-VIDs to be translated so that the B-VID in use on the PBT network is not the same as the B-VID used on the MPLS network. This has implications with connectivity fault management, however, the reverse VLAN ID may be carried in the CFM payload. Thus, if the S-PE is performing B-VID translation, the mapping would need to take place within the CFM payload or another mechanism would need to be implemented to cause the correct B-VID for the reverse path to be carried in the CFM payload.

The PBT networks may be part of the same domain or, alternatively may be separate domains. Where the PBT networks are separate domains, for example if PBT metro X and PBT metro Y implement separate control planes, then the PBT trunk segments will not extend end-to-end across the network. Rather, the S-PEs will maintain a mapping on a per-ISID basis to map traffic between trunk segments.

Figure 13:
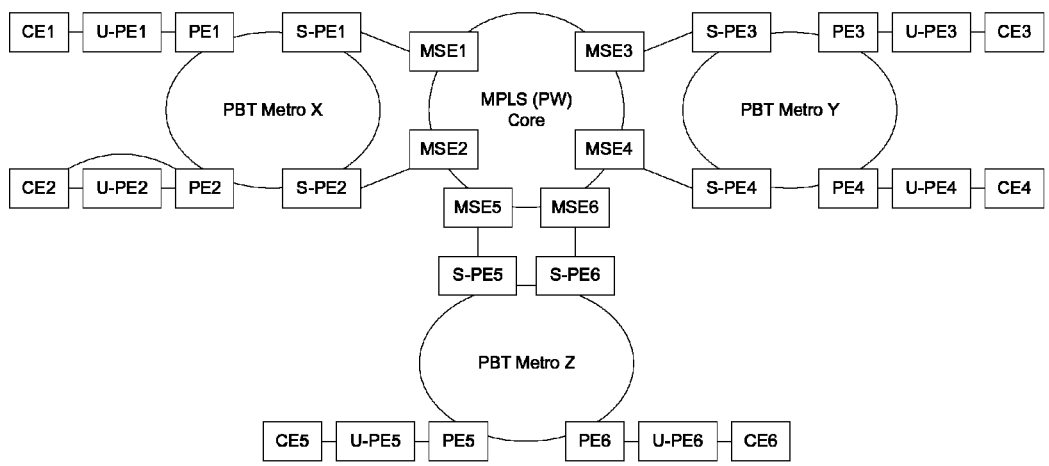
FIG. 13 is a functional block diagrams of a reference view of a network including Ethernet (PBT) networks belonging to different domains and an MPLS (PW) core network.
Figure 14:
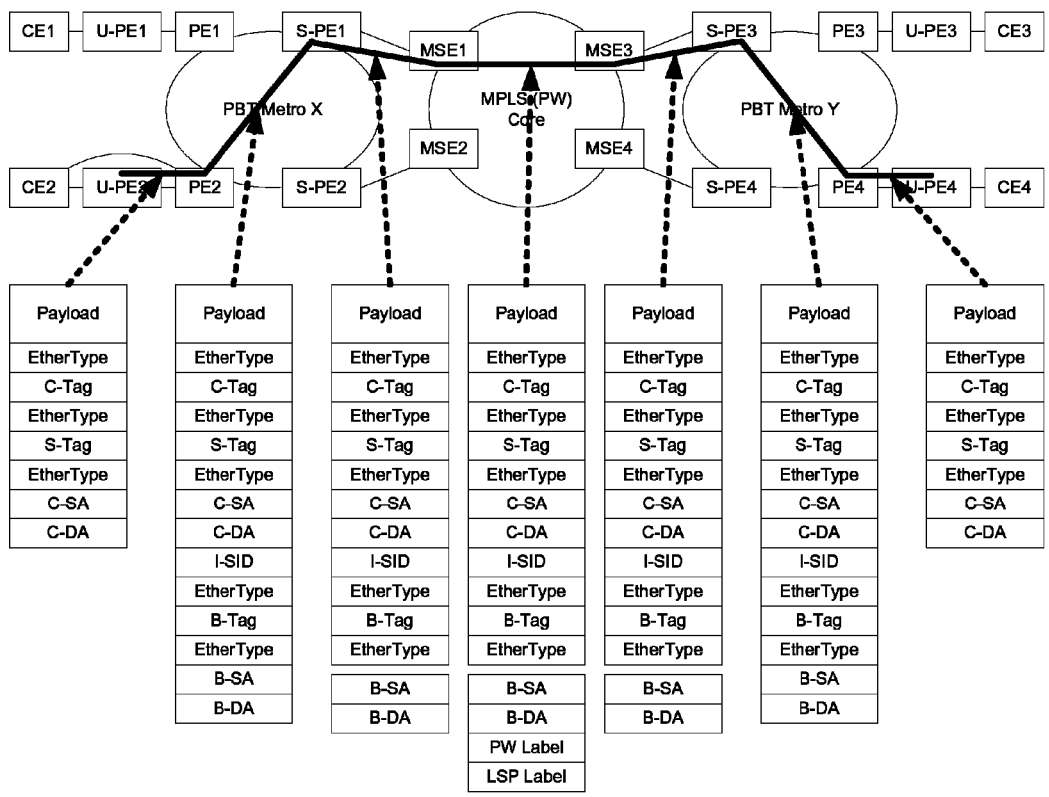
FIG. 14 is a functional block diagram of a path through the reference network of FIG. 13 illustrating the format of the headers applied to the data as it traverses the network according to an embodiment of the invention.

For example, as shown in FIGS. 13-14, the Ethernet access switch (U-PE) will hand off Ethernet frames (which may be encapsulated native service frames) to the PE. The PE offers an Ethernet UNI and either port-based E-line service or tagged E-line service. The PE will thus use either the port, VLAN, or both to identify the service instance. The PE will encapsulate the frame in a PBT trunk within the metro, as shown in FIG. 14, by assigning a service identifier (I-SID), B-Tag, and destination MAC address (DA). The DA in this instance will be the DA of the S-PE that will forward the traffic out of the metro network. The I-SID is recommended to be end-to-end unique, but may be locally significant only within each metro.

When the S-PE receives the frame it will determine the PBT segment across the MPLS core. As with the example discussed above, each metro allocates B-VIDs such that a particular B-VID is used only to connect to one other metro. The S-PE maintains a mapping of PBT segments and maps the traffic to the next PBT segment. The B-VID used for the segment is selected such that the B-VID will cause the frame to be forwarded across the MPLS core to the correct metro.

When the MSE receives the frame, it will read the B-VID and place the frame onto a LSP/PW through the core to the correct metro by assigning a PW label and LSP label. The egress MSE will strip off the PW and LSP labels and forward the frame to the S-PE on the metro. The S-PE will either perform a second mapping to map the frame to a PBT trunk within the second metro or will directly forward the frame onto the trunk within the metro. This second option may exist where the PBT trunk segment extends from the second metro across the MPLS core. Where the frame is mapped to different trunk segments, the PBB header or portions of the PBB header such as the B-DA and B-SA, B-VID, and I-SID may be changed so that these values are unique within each PBT tunnel.

Figure 15:
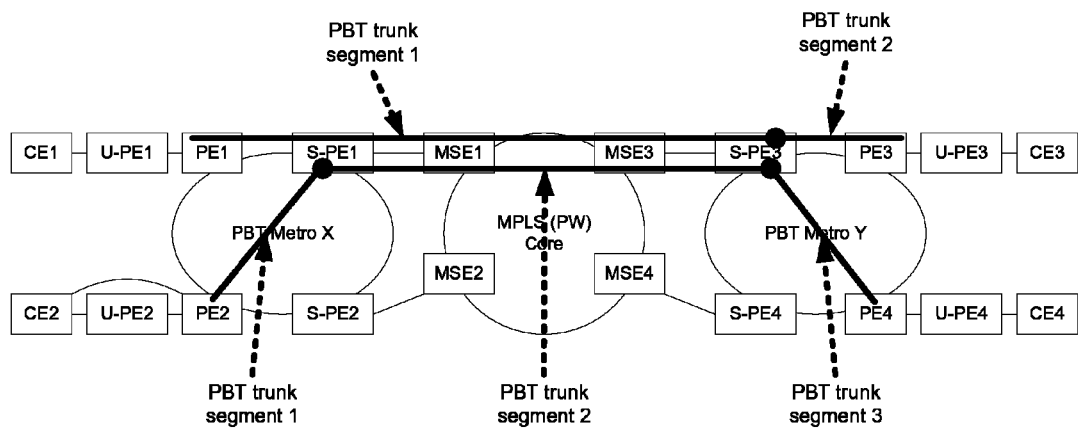
FIG. 15 is a functional block diagram showing PBT trunk segments in the network of FIG. 13 according to an embodiment of the invention.

FIG. 15 shows multiple trunk segments extending end to end across a network having split PBT metro domains. The PBT trunk may be implemented to include several segments. For example, a first PBT trunk segment may exist in PBT metro X, a second PBT trunk segment may extend between S-PEs on different metros across the MPLS network, and a third PBT trunk segment may extend across the PBT metro Y. Optionally, as mentioned above, a two segment PBT path may be implemented such that either the first and second PBT trunk segments or the second and third trunk segments are implemented as a single trunk segment.

For resiliency, PE pairs maintain primary and secondary trunks, which are monitored via connectivity check messages. The S-PE at the edge of each metro provides the interworking function. It is I-SID aware and maintains, on a per-I-SID basis, a mapping between trunk segments that extend over the PBT metro and the MPLS core. The mapping is maintained in both directions so that the S-PE is able to map frames from a PBT trunk on the metro to a PBT trunk on the core, and conversely from a trunk on the core to a trunk on the metro. The S-PE thus provides a UNI functionality to map frames to trunks on the PBT network. The MSEs will map frames to PWs on a per-B-VID basis, so that the S-PE is not required to modify the format of the frames when passed to the MSEs. Alternatively, the S-PE may offer PW UNI to participate in PW signaling and apply PW labels to frames before they are forwarded onto the MPLS core.

Encapsulation of frames with different PBT domains interconnected with an MPLS core is the same as the encapsulation process described above in connection with a unitary PBT domain extending across an MPLS core. However, since the S-PEs are mapping between PBT tunnels, the destination address of the packet on each segment will be set to be the terminating device on that segment. Thus, for example in FIG. 15, PE2 will create a header for use in the PBT network and use the MAC address of S-PE1 as the destination address. S-PE1 will remove the MAC header and create a new MAC header using the MAC address of S-PE3 as the destination address. As noted above, the B-VID that is applied to the MAC header by S-PE1 will be the B-VID that allows the MSE to select a PW that connects PBT metro X to PBT metro Y. Thus, although the encapsulation does not change, the end points of the PBT trunk segments will replace the values of the header with new values to reflect associated with the new PBT trunk segment.

Figure 16:
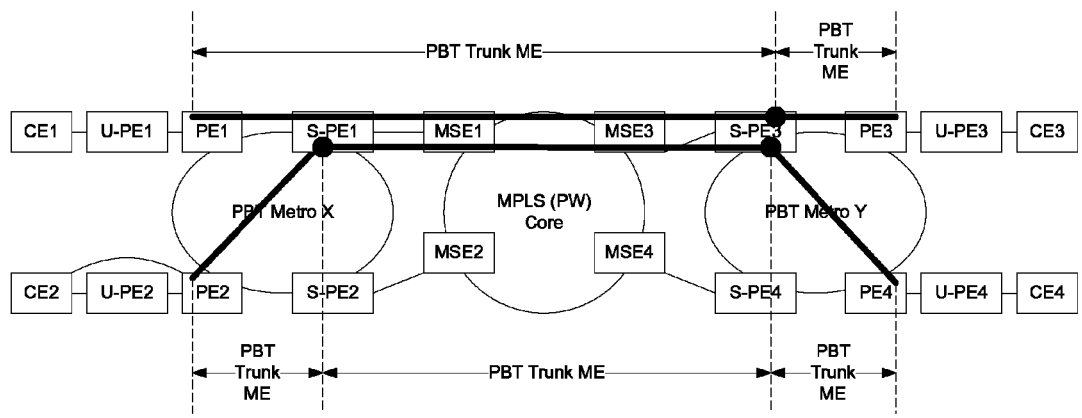
FIG. 16 is a functional block diagram showing example maintenance entities that may be implemented in the network of FIG. 15 according to an embodiment of the invention.
Figure 17:
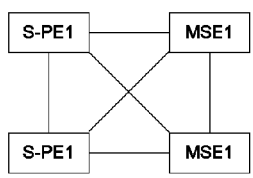
FIGS. 17-19 are functional block diagrams showing several different interconnects that may be used to interconnect the PBT and MPLS networks.
Figure 18:
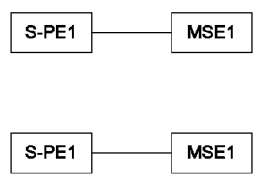
Figure 19:
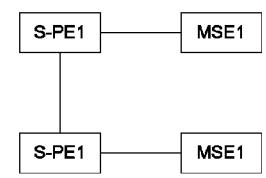

Each PBE trunk segment is monitored on an end-to-end basis by an OAM Maintenance Entity (ME). As shown in FIG. 16, each trunk segment whether it extends across a metro, the core, or across both a metro and the core, is monitored by an OAM ME. The particular resiliency strategy is dependent on the manner in which the PBT domain and the MPLS core are interconnected. FIGS. 17-19 show three example ways in which the domains may be interconnected. In these Figs., FIG. 17 illustrates a full mesh interconnect, FIG. 18 illustrates a dual homed interconnect, and FIG. 19 illustrates a square split multi-link trunking interconnect. The interconnect shown in FIG. 19 differs from that of FIG. 18 in that the two S-PEs in the interconnect of FIG. 19 share state and treat the links extending between the network domains as a common link.

If a full mesh interconnect is in use (see FIG. 17), and a PBT trunk fails within a metro, the PE can detect it and switch over to another PBT trunk. None of the other domains are impacted by this type of failure. Similarly, if the PW in the MPLS domain fails, restoration does not impact the metro domains since the MPLS network may implement a route around the failure in the MPLS network. If the S-PE fails, the PE needs to switch the traffic to a different PBT trunk that should terminate at another S-PE. This requires the PE to switch to another PBT trunk with potentially different VIDs and MAC DA.

If a dual homed interconnect is used, as shown in FIG. 18 or 19, and a PBT trunk fails in the metro, the PE will detect it and the S-PE can determine which I-SIDs are affected by the failure. The S-PE can then send Alarm Indication Signals (AIS) at the I-SID level on the PBT trunks across the WAN core associated with those I-SIDs. If a PBT trunk across the MPLS core fails, the S-PE can determine which I-SIDs are impacted and send Alarm Indication Signals at the I-SID level on PBT trunks across the metro associated with those I-SIDs. Upon detecting a PBT trunk failure or receiving an I-SID AIS notification, the PE can switch the service instance (I-SID) to a backup PBT trunk. This type of interconnect thus requires the PE to switch to another PBT trunk with potentially different VID and B-DA. The same behavior applies when an S-PE fails.

Some of the advantages associated with interworking split PBT metro domains with an MPLS core are that the S-PE is not required to introduce any modifications to the data path. Thus, a normal S-PE should be able to be used to implement an interworking of this nature. Additionally, OAM scaling issues are not severe, and end-to-end service level monitoring is possible. The metros are also able to remain autonomous without visibility into each other's address space, while a full mesh of connectivity between metros may be implemented across the MPLS core.

On the other hand, S-PEs are required to be I-SID (service instance) aware. The S-PEs need to change PBT trunks for I-SID flows and the S-PEs need to be configured to map I-SIDs to PBT trunks in the Metro and over the core. End-to-end trunk level OAM is not possible, and requires notification at the I-SID level.

If the customer is implementing OAM as well, and is not using S-tagged or C-tagged frames, or if the customer S-Tag or C-Tag is removed during the 802.1ah encapsulation process, then the ME level space may need to be split so that both the customer and the provider may use the same ME level space.

In the previous example, the S-PE was described as mapping PBT trunks on a per-I-SID basis. Optionally, where the I-SID is not end-to-end unique, the S-PE may also map I-SIDs so that different I-SID values may be used for the same flow in each of the trunk segments. In this instance, the S-PE would receive a frame, read the I-SID to determine the next PBT trunk segment, and also use the I-SID to determine the I-SID to be used as a service identifier on the next PBT trunk segment.

Similarly, the S-PE may map PW labels between domains, for example where PW over PBT is being implemented (see FIG. 11) so that different PW label management may be used in each of the domains. The S-PE may therefore implement PW label translation between PBT trunks as well as other types of mappings between PBT trunks. Where the p-bits are used to provide a particular type of service on the PBT network, the S-PE or MSE may map the p-bits to LSP EXP bits on the MPLS network. Additionally, the S-PE may map p-bits between PBT tunnels such that the same quality of service (as determined by the p-bits) is implemented on both PBT tunnel segments.

It is also possible to implement PBB metros interconnected via an MPLS core. In this embodiment, the Ethernet access switch (U-PE) hands off Ethernet frames to the metro access switch (PE). The PE uses the VLAN ID (VID) to identify the service instance (I-SID). The PE encapsulates the frame in a PBB tunnel and ships it across the PBB network. The I-SID is end-to-end unique. The B-VID and multicast address assignments that are used to create one or more PBB tunnels may be implemented via traffic engineering.

Resiliency is provided by redundant interconnects and by running xSTP across a single domain joining the several metros. The MPLS core provides a VPLS service instance per B-VID that it is exposed to, and forwards traffic based on the B-DA. When offering VPLS, the MSE will provide bridged Virtual Switch Instance (VSI) (not per port VSI) such that it can switch between different ports. When replication needs to occur across the WAN, the MSE does so similar to VPLS. The S-PE is not required to maintain a special mapping in this case. Additional details associated with PBB metros and an VPLS core are contained in U.S. patent application Ser. No. 11/540,023, entitled Method And Apparatus For Transporting Ethernet Services, filed Sep. 30, 2006, the content of which is hereby incorporated herein by reference.

In a network including PBB metros and an MPLS core, the PBB tunnels can be monitored on an end-to-end basis. When an S-PE or MSE or NNI or link within a metro fails, the spanning tree in use on the metro or the link state protocol (where the Ethernet metro is a link state protocol controlled Ethernet network) can address the failure via redundant paths. If the failure leads to network segmentation, the PBB tunnel monitoring will be able to detects this, however rectification of the problem and restoration would require manual intervention.

Where failure occurs in the MPLS core, the MPLS network may have no way to signal to the xSTP instance in the metro that the failure has occurred. Thus, the xSTP will not be able to initiate restoration/reconvergence for an unacceptably long period of time or may have an unacceptable detection time. To mitigate this, a monitoring domain may be implemented at the S-PEs to allow the S-PEs to implement a PBB segment Maintenance Entity (ME) across the segment of the PBB tunnel that extends across the MPLS core network.

If a PBB segment ME indicates failure, the S-PE should trigger xSTP convergence. Since the failure in the MPLS domain may not be propagated into the PBB network, when the connectivity fault management (CFM) being run across the PBB segment between the S-PEs (which spans the MPLS domain) indicates a failure in the MPLS domain, the S-PEs should initiate xSTP convergence assuming a failure on the PBB segment. This allows the network to reconverge quickly upon detection of a failure in the MPLS network to allow a new set of PBB tunnels to be established that can span the MPLS network and avoid the failed tunnel.

The S-PE is not required to be modified to enable PBB networks to interconnect with MPLS core network and thus can implement an NNI handoff to the MPLS core network. The S-PEs do not need to maintain visibility to the I-SIDs or to individual service instances. A full mesh of WAN connectivity may be implemented in the MPLS core network between all pairs of metros. Additionally, end-to-end service level monitoring is possible as is segment monitoring across the MPLS core.

However, since the PBB networks are implemented as a single large metro domain, running a single xSTP spanning instance or link state protocol instance, the large domain may make multicast domain difficult to manage. Additionally, the metros are not autonomous and, thus, need to have visibility into each other's address space. The metros are also required to implement some form of loop avoidance technique, such as xSTP.

Figure 20:
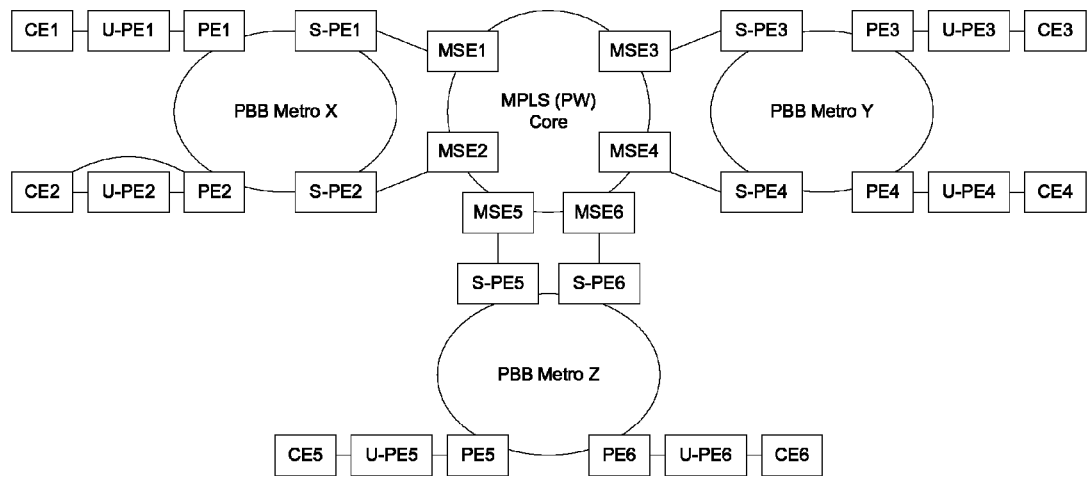
FIG. 20 is a functional block diagrams of a reference view of a network including Ethernet (PBB) networks belonging to different domains and an MPLS (PW) core network.
Figure 21:
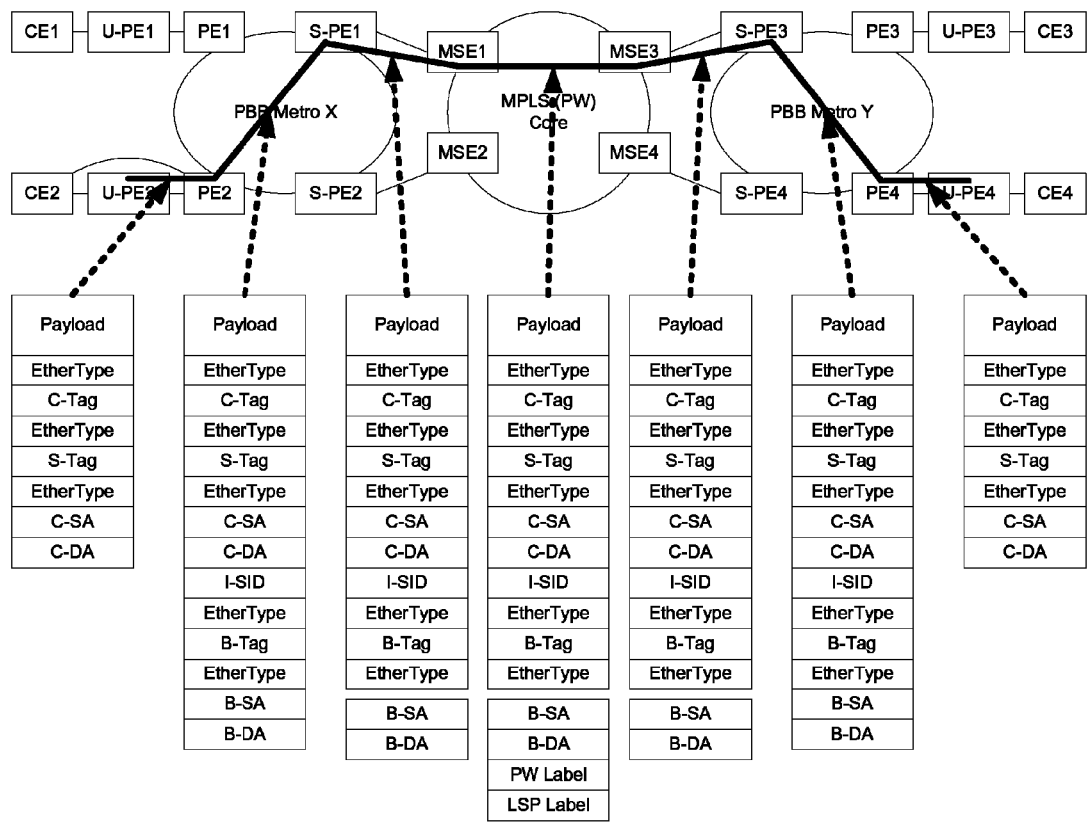
FIG. 21 is a functional block diagram of a path through the reference network of FIG. 20 illustrating the format of the headers applied to the data as it traverses the network according to an embodiment of the invention.

FIG. 20 illustrates an embodiment where the MPLS core implements PWs. In this embodiment, the Ethernet access switch (U-PE) will hand off Ethernet frames to the metro access switch (PE). The PE uses the VLAN to identify the service instance (I-SID), encapsulates the frame in a PBB tunnel, and transmits the frame across the PBB network. The I-SID is end-to-end unique. The B-VID and multicast address assignments are implemented via engineering. At the S-PE, different physical interfaces are used to connect to different peer PBB domains. If the number of interfaces becomes a concern, aggregation structures may be employed.

By using a different physical interface on the S-PE for each destination metro, the MSE can implement a PW service instance on a per-port basis. Alternatively, the MSE may implement a PW service instance on a per-B-VID basis. The S-PE implements the equivalent of a Virtual Switch Instance, since the S-PE is responsible for replicating frames to multiple ports or outputting the frame using multiple B-VIDs. Thus, the MSE will receive the frame multiple times (once for each destination Metro) and map the frames to PWs through the MPLS core to the destination metros.

Where a link state protocol is in use on the PBB network, the S-PE may view different interfaces as regular bridged ports and may use inherent bridge replication. Resiliency, in this instance, may be provided by implementing redundant interconnects from the S-PE to the MPLS network and running a common link state protocol instance across the several PBB networks.

From an encapsulation perspective, the service frame (which may or may not contain the C-Tag and S-Tag) will be encapsulated using 802.1ah by PE2. Since the various PBB metros are implementing a common control plane, PE will have visibility into PBB metro Y's address space and may create a provider MAC header that includes the MAC address of PE4 as the destination MAC address (DA=PE4). Thus, the 802.1ah MAC header need not be changed as the frame traverses the network.

When the frame is passed to the MSE at the ingress to the MPLS core network, the MSE will map the frame based on the port on the S-PE over which it was sourced, or based on the B-VID, and apply a PW label and an LSP label to transport the frame across the MPLS network.

From a resiliency standpoint, the PBB tunnels can be monitored on an end-to-end basis. when an S-PE, MSE, NNI, or link within the metro fails, the link state protocol being run on the PBB metro may address the failure in a normal manner (i.e. via a redundant PBB tunnel). If the failure leads to network segmentation, the failure will be detected by the end-to-end Maintenance Entity, but correction will require manual intervention.

If a failure occurs in the MPLS core, the MPLS network may not be able to signal the failure to the PBB metro networks. This may result in the PBB networks being unable to initiate reconvergence/restoration within an acceptable period of time. Accordingly, the S-PEs may implement a PBB segment ME across the MPLS core to allow the S-PEs to detect a failure within the MPLS network. Upon detection of a fault on the PBB segment ME extending between the S-PEs across the MPLS core, the S-PEs may initiate xSTP reconvergence or link state protocol reconvergence to allow the PBB network to route traffic around the failure. Thus, if the PBB segment ME indicates failure, the link state protocol should be notified to trigger convergence. This allows reconvergence to be initiated without explicit notification of the failure from the MPLS network to the PBB networks.

The S-PE does not require modification to the data path to implement handoffs to the MPLS network. The S-PEs also are not required to maintain visibility to the I-SID or individual service instances. A full mesh of connectivity between metros may be implemented in the MPLS core, and end-to-end service level monitoring is possible.

On the other-hand, implementing one big metro domain across the several metro networks means that the multicast domain is concomitantly large and, hence, difficult to manage. Metros are also not autonomous, and need to have visibility into each other's address space. A loop avoidance technique, such as reverse path forwarding check implemented in connection with a link state protocol such as Open Shortest Path First (OSPF) or Intermediate System to Intermediate System (IS-IS) is also required.

In addition to implementing the PBB metros as one domain, it is possible to run different xSTP or link state protocol control instances in each of the PBB metros to allow the metros to be independent. Where split PBB metros are interconnected across an MPLS domain, the PBB metros will implement PBB tunnels between the PEs and S-PEs. The I-SID in this case may be end-to-end unique or may be metro-specific. Resiliency is provided by redundant interconnects between the PBB metros and the PLSB core, and by running xSTP within each domain—i.e. each PBB metro runs its own xSTP instance.

The MPLS core provides VPLS service instance per B-VID that it is exposed to. B-VLAN IDs are allocated based on per-connectivity required across metros. Thus, if there are five metros, 24 VPLS instances will be required to interconnect the metros (10 connecting each metro pair, 9 connecting 3 each, 4 connecting 4 each, and 1 connecting all of the metros).

When a frame is received at the PE in metro X it will be encapsulated using 802.1 ah and mapped to a PBB tunnel within metro X. If the C-DA of the frame that is received by the PE is unknown to the PE, the PE will map the frame to a multicast MAC DA in the B-VID tunnel (PBB tunnel). The S-PE terminates the B-VID tunnel, and maps the B-VID tunnel across the WAN, which means that the S-PE maintains a mapping between I-SID or C-DA and corresponding B-VID tunnel and B-DA for use in across the MPLS core in a manner similar to the mapping maintained by the PE. Additionally, the receiving S-PE will map the received frame to a B-VID tunnel across Metro Y.

Within the MPLS core, the MSE treats the frames like regular Ethernet frames. Since the MPLS core has implemented VPLS service instances on a per-B-VID basis, the MSE will map the frame using the B-VID to a VPLS service instance and forward it across the MPLS network. The Ethernet frames will be received by one or more egress metros to be forwarded onto those metro networks.

Thus, in this embodiment, the S-PE maintains a mapping of I-SID and C-DA to B-VID and B-MAC in both directions. The S-PEs also run xSTP or a link state protocol in the control plane and in the MPLS WAN using distinct V-LAN space. The S-PE will also correlate failures between the Metro and MPLS core domains to block/unblock forwarding states depending on the state of the networks.

From a resiliency standpoint, the PBB domain will be able to detect and correct for failures that occur within the PBB domain. The MPLS domain may have no way of signaling failures that occur in the MPLS core, however. Thus, the S-PEs may implement OAM maintenance entities across the core to detect for failure in the MPLS core and initiate reconvergence in the PBB network upon detection of a failure on the PBB segment maintenance entity.

Since the PBB domains are separate domains, the S-PE is required to map flows between PBB tunnels. Accordingly, the S-PE will map flows from one PBB tunnel to the other PBB tunnel based on the I-SID or the C-DA. Thus, the S-PE maintains a mapping to enable it to perform the mapping between I-SID and target PBB Tunnels. The S-PE may also translate other values, such as B-VID, to allow for independent B-VID management in different domains. Similarly, the S-PE may maintain a table of ingress multicast DA and egress multicast DA to allow for translation of multicast DA between domains. This may be particular useful where the metro domain allocates multicast DAs using an algorithm different than that used by the core PLSB domain, i.e. when the core uses an I-SID unique multicast DA. The S-PE is also required to support control xSTP instances, which allows the S-PE to block data forwarding for particular sets of VIDs.

Split PBB domains may be implemented and interconnected by an MPLS network providing PW service, where the S-PEs are not configured to perform B-VID translation. In this instance, the S-PEs would run a control instance such as xSTP or a link state protocol, to enable the S-PEs to implement a common control plane. This allows the S-PEs to block data forwarding for particular sets of B-VIDs.

In this embodiment, the S-PE will switch flows from PBB NNI to PBB NNI based on I-SID. The S-PE will thus maintain a mapping of I-SIDs to PBB tunnels and maintain a table of ingress multicast DA and egress multicast DA to allow translation of multicast DA between tunnels. This is needed where the metro domain allocates multicast DA using an algorithm that is different than the algorithm used by the core domain, which uses I-SID unique multicast DAs. Optionally, the S-PE may allow B-VID translation between tunnels so that independent management of B-VID may occur in the different domains. For resiliency, the S-PE should implement segment PBB tunnel maintenance entities to detect faults on the MPLS network, and trigger xSTP or link state protocol reconvergence upon detection of a failure. Additionally, the S-PE may allow for I-SID translation between PBB tunnels to allow for independent management of I-SIDs in different domains.

Implementing split PBB domains reduces the size of the xSTP or link state protocol domains, which makes the domains more manageable from a control standpoint. Additionally, the metros are autonomous, so that they do not need to have visibility into each other's address space except at the S-PE. A full mesh of connectivity may be supported in the core network between each pairs of metros. Additionally, end-to-end service level monitoring is possible.

However, the S-PEs are required to be I-SID aware and C-MAC aware. The S-PE needs to provide a mapping between PBB tunnels and B-MACs based on the I-SID and C-MAC. It also requires coordination of failures within different instances of xSTP or link state routing protocol at the S-PE. The solution also requires the use of some loop avoidance technique, such as implementation of xSTP or link state routing protocol in the control plane.

Figure 22:
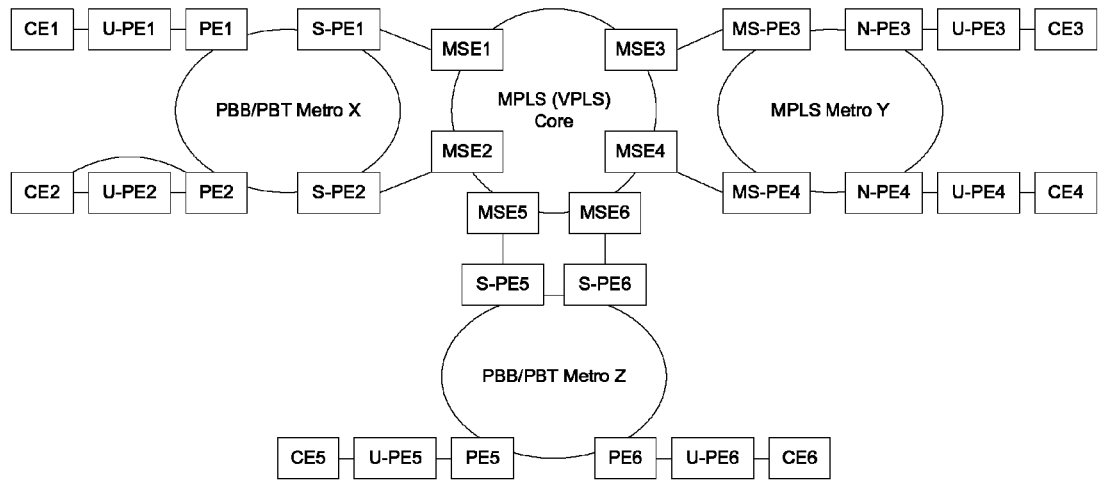
FIG. 22 is a functional block diagrams of a reference view of a network including Ethernet (PBB/PBT) networks and MPLS networks interconnected over an MPLS (VPLS) core network.
Figure 23:
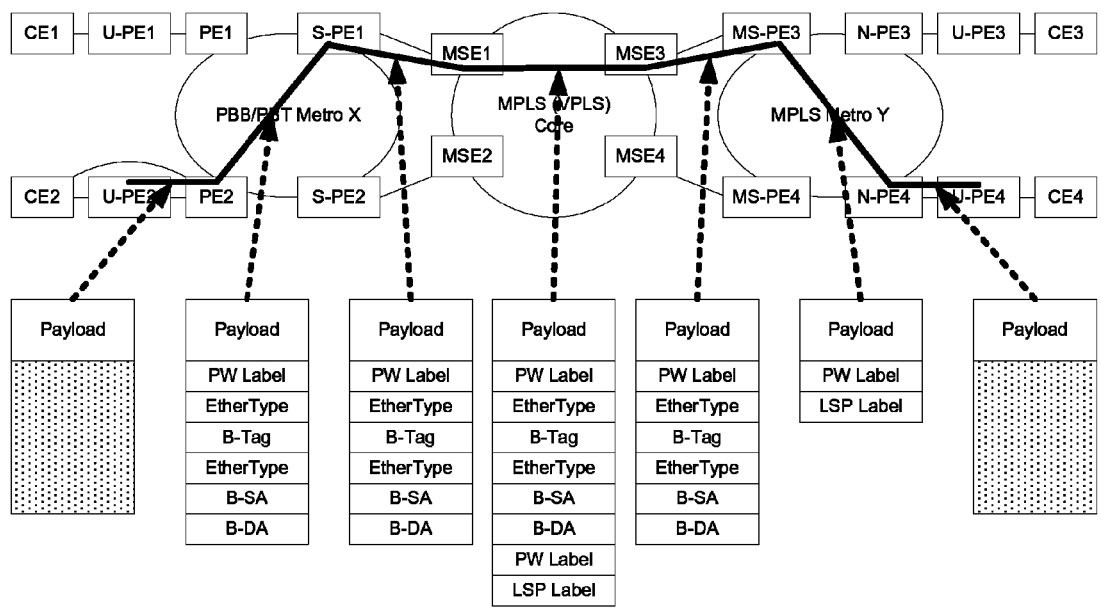
FIG. 23 is a functional block diagram of a path through the reference network of FIG. 22 illustrating the format of the headers applied to the data as it traverses the network according to an embodiment of the invention.

FIGS. 22 and 23 show another interconnection scenario in which both PBB/PBT and MPLS metros are interconnected across an MPLS core network implementing VPLS service. Services, in this scenario, will be assumed to be driven from an MPLS standpoint—what an MPLS network might be offering. For example, an MPLS metro may offer VPLS service or PW service. For end-to-end PW service, the PBT/PBB metro will offer PW over PBT, and the MPLS metro may implement PWs. For end-to-end VPLS, the PBT/PBB metro will implement PBB tunnels while the MPLS metro may implement VPLS or PW spokes.

In the embodiment shown in FIG. 22, the access switch (U-PE) hands off native service frames to the PBB/PBT access switch (PE) to be carried transparently over a PW service. The PE may encapsulate different native services using PW over PBT. In the other direction, the access switch will hand off native service frames to the MPLS access switch (N-PE) which will encapsulate the native services to be carried transparently over a PW service. The PE and N-PE establish an end-to-end PW. The PE and N-PE is not necessarily aware of the other metro, however.

An end-to-end PW may be established manually via a network management plane or via signaling in the control plane. If MS-PW signaling is used, then the PE and N-PE would serve as terminating PEs (T-PEs) and the S-PE and MS-PE would serve as switching PEs (S-PEs). Optionally the MSE can also act as an S-PE.

FIG. 23 shows the encapsulation of traffic as it passes across the network of FIG. 22. As shown in FIG. 23, when PE2 receives a packet it encapsulates the packet with a PW label. PE2 may provide encapsulation for different types of traffic, i.e. different native type UNIs. The PE will also apply a MAC header to the packet to place the packet onto a PBT trunk through the metro network X.

When the S-PE receives the packet, it will remove the MAC header and use the PW label to map the packet to a PBT trunk across the MPLS core. The S-PE thus maintains a mapping between PBT trunks in either direction based on PW label.

The MPLS core will provide VPLS instances for each B-VID that it is exposed to, which would thus not require the metro to make any modifications to frames across the NNI. Thus, the B-VID of the PBT trunk across the MPLS core may be selected according to the VPLS instance that is to be used to transport the packet to one or more destination metros.

When the MPLS metro receives the packet, the MS-PE on the MPLS metro (MS-PE3 in FIG. 23) would treat the frames as link local tagged frames. Thus, the MS-PE will remove the Ethernet encapsulation header and treat the frames as PW frames. The MS-PE will thus read the PW label and apply a LSP label to forward the packet across the MPLS network. The MS-PE is required, in this instance, to support static PW UNI to enable it to read the PW and select a LSP for the packet.

From a resiliency standpoint, each PBT trunk may be monitored on an end-to-end basis by implementing a PBT trunk maintenance entity. In the MPLS domain the path may be monitored via an MPLS LSP maintenance entity. The end-to-end service may also be monitored using a PW Virtual Circuit Connection Verification (VCCV) or via MS-PW OAM.

Advantageously, no modifications are required to the data path at handoff. Additionally, the PWs that are required to be set up in the MPLS core scale on the order of O(n), where n is the number of Metros connected to the MPLS core. Also, a full mesh of connectivity may be implemented between the metros. The metros are autonomous, and thus do not need to have visibility into each other's address space. Additionally, end-to-end service level monitoring is possible.

On the other hand, S-PEs are PW label (service instance) aware. In addition to PBT trunk configurations, S-PEs need to be configured to map PW labels to the PBT trunks in both directions (into the PBT metro and into the MPLS core). End-to-end trunk level OAM is not possible, and requires notification at the PW level. The MS-PE will also be required to support a static PW UNI, if MS-PW signaling is not used.

In summary, the S-PEs switch flows from PBT-NNI to PBT-NNI (between PBT Trunks) based on the PW label (where PW over PBT is used in the PBT network). The PE and S-PE also support VCCV OAM on the PW to monitor the service on an end-to-end basis. When the S-PE detects a failure of a PBT trunk, it will determine the PWs affected by the failure and generate an Alarm Indication Signal (AIS) at the PW level on the corresponding PBT trunk. Optionally, trunks may be implemented as PBT trunk groups for monitoring purposes.

The S-PE may implement several additional features to reduce the amount of interdependence between the domains. For example, the S-PE may allow PW label translation between PBT trunks, to allow for independent management of I-SIDs in the different domains. Additionally, the S-PE may implement B-VID translation between PBT trunks and may also implement DA translation between PBT trunks. This solution requires the MS-PE to support a static PW UNI.

Figure 24:
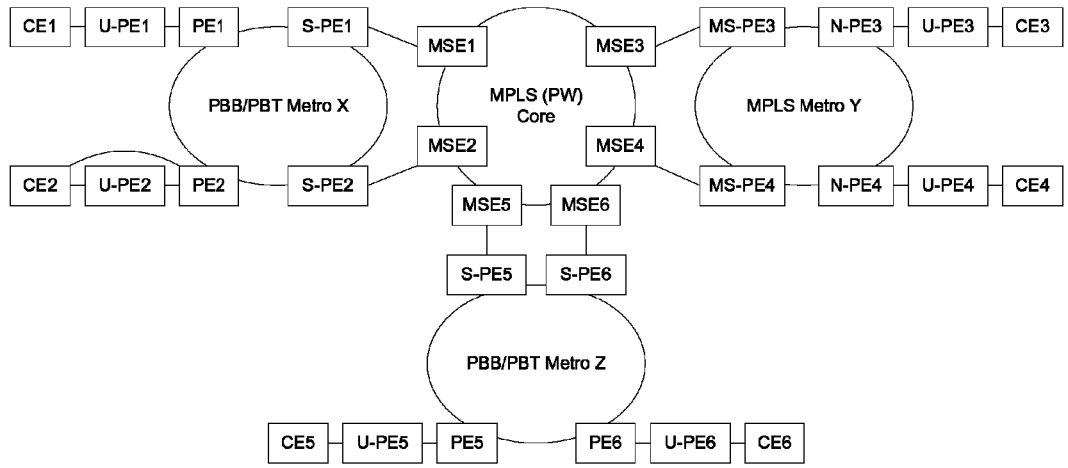
FIG. 24 is a functional block diagrams of a reference view of a network including Ethernet (PBB/PBT) networks and MPLS networks interconnected over an MPLS (PW) core network.
Figure 25:
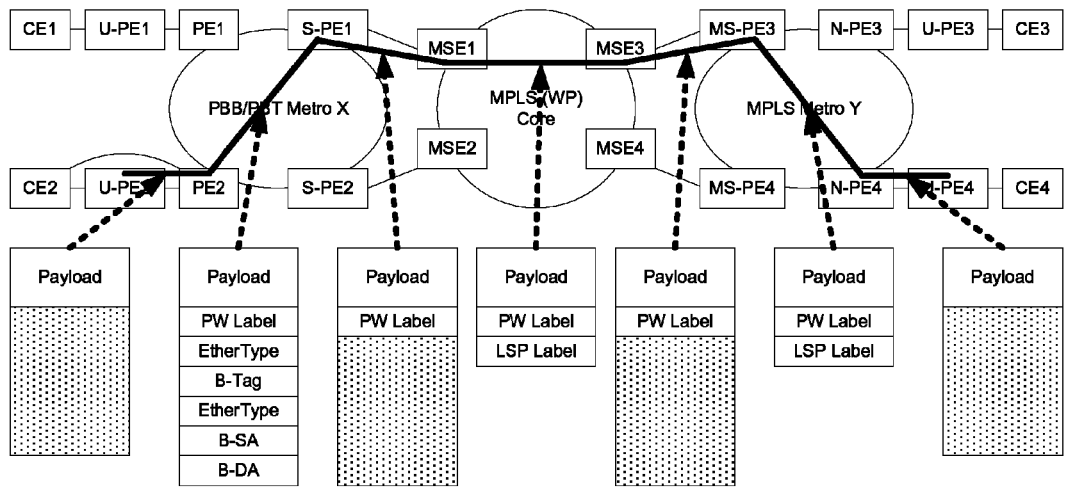
FIG. 25 is a functional block diagram of a path through the reference network of FIG. 24 illustrating the format of the headers applied to the data as it traverses the network according to an embodiment of the invention.

FIGS. 24-25 show a scenario in which the MPLS core that interconnects the PBT and MPLS metros is implements PWs rather than VPLS service instances.

In the scenario shown in FIGS. 24-25, the access switch (U-PE) will hand off native service frames to the MPLS/PBT access switch (N-PE/PE) to be carried transparently over a PW service. The N-PE may encapsulate different native services (e.g. TDM) over the PW. The PE may encapsulate different native services over PWoPBT. The N-PE and PEs establish end-to-end PWs to be used to carry the traffic across the network. The PE and N-PE, however, are not necessarily aware of the other metro.

End-to-end PWs may be established by manual provisioning at the management plane or by PW signaling in the control plane. If MS-PW signaling is used, then the PE and N-PE would serve as terminating PEs and the S-PE and MS-PE would serve as switching PEs (S-PEs). The MSE may also act as a switching PE if desired.

FIG. 25 shows the encapsulations that may be used to transport the service frame (payload) across the network. As shown in FIG. 25, when a PE receives a packet from the U-PE, it will encapsulate it with a PW label and also apply a MAC header to place the Packet onto a PBT tunnel across the PBT metro. When the S-PE receives the packet, it terminates the PBT tunnel and removes the MAC header. The S-PE provides a mapping of PW label to PBT trunks in the metro direction, and maintains a mapping of PBT trunk to PW label in the direction of the MPLS core.

The S-PE will remove the PBT trunk MAC header and apply a link level MAC header and forward the packet to the MSE. The MSE will strip off the link MAC header, read the PW label, and apply a LSP label to forward the packet across the MPLS network. The egress MSE will remove the LSP label, read the PW label, and apply a link level MAC header to forward the packet to the MPLS metro Y. The MS-PE will remove the link level MAC header, read the PW label, and apply a LSP label to forward the packet across the MPLS metro network Y. The egress N-PE will remove the PW label and forward the packet to the U-PE.

From a resiliency standpoint, each PBT trunk ME may be monitored on an end-to-end basis in each domain. In the MPLS domain, the trunk may be monitored by monitoring the MPLS LSP. The end-to-end service may also be monitored by using a PW Virtual Circuit Connectivity Verification and MS-PW OAM.

The scenario has similar advantages/disadvantages as the scenario described above with respect to FIGS. 22 and 23 in which the MPLS core offered VPLS service rather than PW service. However, in this instance MS-PW signaling is required to be implemented across the PE, S-PE, MSE, and MS-PE.

Figure 25A:
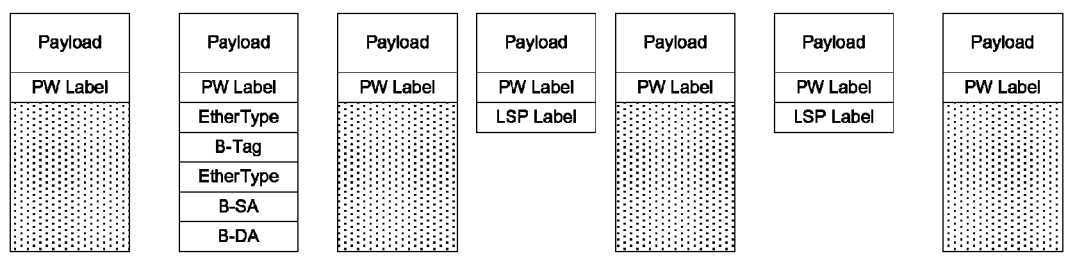
FIG. 25A is a functional block diagram of a path through the reference network of FIG. 24 illustrating another format of the headers applied to the data as it traverses the network according to an embodiment of the invention.

FIG. 25A shows another encapsulation scenario in which the U-PE implements PW encapsulation prior to forwarding the packet to the PE. Thus, in this example the PW label is applied at the U-PE before being transmitted to the PE, rather than having the ingress PE apply the PW label to the frame. The other encapsulation processes described above with respect to FIG. 25 may be used to transport this frame across the network.

In the previous two scenarios, it was assumed that the PW was maintained end-to-end. Optionally, the PW may be switched (mapped) at one or more locations along the end-to-end path to enable the domains to remain independent. For example, the S-PE may map PW labels in addition to mapping packets to/from PBT tunnels on a PW basis. This allows different PWs to be used in the PBB/PBT metro X than are used in the MPLS core. Similarly, the MSE may map PWs to allow different PW labels to be used in the interconnect than are used in the MPLS core. Likewise, the MS-PE may map PW labels to allow different PW labels to be used in the MPLS metro Y than are used in the MPLS core. Thus, many different mappings may occur depending on which nodes on the network are configured to map parameters for the packet as the packet is passed along a path on the network.

The network elements described above, such as the PE and S-PE, as well as the MSE and N-PE, are all conventional network elements. The network elements are programmed, however, or have hardware implementations, that will enable them to perform the functions described above to place traffic on tunnels through the network and to switch traffic from tunnel segments. Similarly, the network elements include software, hardware, and/or firmware that will enable the network elements to participate in OAM maintenance entities and other OAM flows to enable appropriate monitoring to occur as described in greater detail above. Thus, the invention is not limited to any particular hardware implementation as many different network element hardware platforms have been created over the years and are likely to be created in the future as network elements continue to evolve.

Thus, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A network including:
a plurality of Multi-Protocol Label Switching (MPLS) networks interconnected by an intervening Ethernet network, the intervening Ethernet network:
implementing an IEEE 802.1 Ethernet protocol;
including a plurality of Ethernet network elements interconnected between the MPLS networks;
implementing a control plane separate from a control plane of the MPLS networks, the control plane of the intervening Ethernet network being used by the plurality of Ethernet network elements to determine which links between Ethernet network elements should be used to forward traffic on the intervening Ethernet network to enable traffic from one of the MPLS networks to be forwarded to another of the MPLS networks;
providing a plurality of paths established using the control plane of the intervening Ethernet network to interconnect pairs of MPLS networks; and
Ethernet encapsulated Label Switched Path (LSP) frames received from one of the MPLS networks at an ingress to the intervening Ethernet network being mapped onto the paths at the ingress to the intervening Ethernet network according to classification identifiers associated with the Ethernet encapsulated LSP frames, each of the plurality of MPLS networks coupled to the intervening Ethernet network having MPLS access switches establishing a pseudo-wire service between the MPLS access switches across the intervening Ethernet network, such that native service frames of an MPLS network are carried transparently over the pseudo-wire service.

2. The network of claim 1, wherein the intervening Ethernet network is a Provider Backbone Trunking (PBT) network, the paths are PBT trunks, and the classification identifiers are physical ports at the ingress to the Ethernet network.

3. The network of claim 1, wherein the intervening Ethernet network is a PBT network, the paths are PBT trunks, and the classification identifiers are Virtual Local Area Network Identifiers (VLAN IDs).

4. The network of claim 1, wherein the intervening Ethernet network is a Provider Backbone Bridging (PBB) network, the paths are PBB tunnels, and the classification identifiers are physical ports at the ingress to the intervening Ethernet network.

5. The network of claim 1, wherein the intervening Ethernet network is a PBB network, the paths are PBB tunnels, and the classification identifiers are Virtual Local Area Network Identifiers (VLAN IDs).

6. The network of claim 1, wherein Label Switched Path (LSP) EXP bits from the MPLS network are mapped to p-bits of B-Tags in the intervening Ethernet network at the ingress.

7. The network of claim 1, wherein the Ethernet encapsulated LSP frames are Pseudowire (PW) encapsulated.

8. The network of claim 1, wherein the classification identifiers are combinations of Virtual Local Area Network Identifiers (VLAN IDs) and destination Media Access Control (MAC) addresses associated with the Ethernet encapsulated LSP frames.

9. The network of claim 1, wherein the intervening Ethernet network monitors the continuity of paths in the intervening Ethernet network, and upon detecting loss of continuity in at least one of the paths, notifies the MPLS networks via Alarm Indication Signal (AIS) for each classification identifier affected by the failure.

10. A network including:
a plurality of Ethernet networks interconnected by an intervening Multi-Protocol Label Switching (MPLS) network, each of the Ethernet networks including a plurality of Ethernet network elements, the intervening MPLS network including:
a plurality of MPLS network elements; and
a plurality of MPLS network Paths established to interconnect pairs of the Ethernet networks;
Ethernet frames received from one of the Ethernet networks at an ingress to the intervening MPLS network being mapped to be forwarded across the intervening MPLS network according to classification identifiers associated with the Ethernet frames;
the Ethernet networks being implemented as a single Provider Backbone Bridges—Traffic Engineering (PBT) domain having a common control plane, and having traffic engineered paths extending across the intervening MPLS network; and
each Ethernet network using a unique set of Provider Virtual Local Area Network Identifiers (B-VIDs) for traffic engineered paths connecting to each other Ethernet network to identify a destination Ethernet network across the intervening MPLS network, an Ethernet network of the interconnected pairs of Ethernet networks coupled to the intervening MPLS network having an Ethernet access switch to hand off Ethernet frames to a metro access switch to be carried transparently over an E-line service over the intervening MPLS network.

11. The network of claim 10, wherein a Pseudowire is constructed on the intervening MPLS network to provide the same traffic profile as the traffic profile associated with the traffic engineered path within the Ethernet networks.

12. The network of claim 10, wherein the intervening MPLS network implements Operation Administration and Maintenance Management Entities (OAM MEs) on Pseudowires (PWs), and wherein the MPLS network notifies the Ethernet networks of a failure on a PW via Alarm Indication Signal (AIS) on the traffic engineered path.

13. A network including:
a plurality of Ethernet networks interconnected by an intervening Multi-Protocol Label Switching (MPLS) network, the intervening MPLS network having:
a plurality of MPLS network Paths interconnecting pairs of the Ethernet networks;
Ethernet frames received from one of the Ethernet networks at an ingress to the intervening MPLS network being mapped to be forwarded across the intervening MPLS network according to classification identifiers associated with the Ethernet frames;
the Ethernet networks being implemented as multiple independent administrative domains;
each of the independent Ethernet administrative domains including at least one Ethernet network having traffic engineered paths defined therein and which are configured to connect with traffic engineered paths extending across the intervening MPLS network; and
each Ethernet network using a unique set of Provider Virtual Local Area Network Identifiers (VLAN IDs) for traffic engineered paths connecting to each other Ethernet network to identify a destination Ethernet network across the intervening MPLS network,
each Ethernet network of the pair of Ethernet networks interconnected by the intervening MPLS core network having an access switch that hands off native service frames to a PBB/PBT access switch to be carried transparently over a pseudowire service across the intervening MPLS core network.

14. The network of claim 13, wherein the Ethernet networks support VLAN ID translation in both directions to enable different VLAN IDs to be used within the Ethernet networks than are used in connection with traffic that is to be passed across the intervening MPLS network.

15. The network of claim 13, wherein an Ethernet network element on an edge between one of the Ethernet networks and the intervening MPLS network maintains a mapping of traffic engineered paths in the Ethernet network and across the intervening MPLS network, on a per-service instance tag (I-SID) basis.

16. The network of claim 15, wherein the Ethernet network element implements I-SID translation to enable different I-SID values to be used in the Ethernet network and the intervening MPLS network.

17. The network of claim 13, wherein Operation Administration and Maintenance Management Entities (OAM MEs) are implemented on the traffic engineered paths across the intervening MPLS network.

* * * * *